US006260156B1

(12) United States Patent
Garvin et al.

(10) Patent No.: US 6,260,156 B1
(45) Date of Patent: Jul. 10, 2001

(54) METHOD AND SYSTEM FOR MANAGING BAD AREAS IN FLASH MEMORY

(75) Inventors: P. Keith Garvin, Arlington; H. Duane Stanard, Anacortes, both of WA (US)

(73) Assignee: Datalight, Inc., Bothell, WA (US)

( * ) Notice: Subject to any disclaimer, the term of this patent is extended or adjusted under 35 U.S.C. 154(b) by 0 days.

(21) Appl. No.: 09/205,806

(22) Filed: Dec. 4, 1998

(51) Int. Cl.[7] .................... G06F 11/00; G11C 16/00
(52) U.S. Cl. .................... 714/8; 714/710; 711/103; 360/48
(58) Field of Search .................... 714/8, 710, 3, 714/5, 7, 711; 711/202, 205, 206, 207, 103, 170; 360/48, 53; 365/218

(56) References Cited

U.S. PATENT DOCUMENTS

| 4,800,520 | 1/1989 | Iijima . |
| 4,935,825 | * 6/1990 | Worrell et al. . |
| 5,077,737 | 12/1991 | Leger et al. . |
| 5,111,385 | 5/1992 | Hattori . |
| 5,153,880 | 10/1992 | Owen et al. . |
| 5,161,157 | 11/1992 | Owen et al. . |
| 5,179,536 | 1/1993 | Kasa et al. . |
| 5,199,033 | 3/1993 | McGeoch et al. . |
| 5,200,959 | 4/1993 | Gross et al. . |
| 5,245,572 | 9/1993 | Kosonocky et al. . |
| 5,278,793 | 1/1994 | Yeh . |
| 5,297,148 | 3/1994 | Harari et al. . |
| 5,341,339 | 8/1994 | Wells . |
| 5,349,558 | 9/1994 | Cleveland et al. . |
| 5,359,570 | 10/1994 | Hsu et al. . |
| 5,361,343 | 11/1994 | Kosonocky et al. . |
| 5,418,752 | 5/1995 | Harari et al. . |
| 5,428,621 | 6/1995 | Mehrotra et al. . |
| 5,438,573 | 8/1995 | Mangan et al. . |
| 5,471,478 | 11/1995 | Mangan et al. . |
| 5,473,753 | 12/1995 | Wells et al. . |
| 5,475,693 | 12/1995 | Christopherson et al. . |
| 5,477,492 | 12/1995 | Ohsaki et al. . |
| 5,479,609 | 12/1995 | Hsu et al. . |
| 5,535,328 | 7/1996 | Harari et al. . |
| 5,539,697 | 7/1996 | Kim et al. . |
| 5,577,194 | 11/1996 | Wells et al. . |
| 5,602,987 | 2/1997 | Harari et al. . |
| 5,630,093 | 5/1997 | Holzhammer et al. . |
| 5,659,550 | 8/1997 | Mehrotra et al. . |
| 5,671,229 | 9/1997 | Harari et al. . |
| 5,734,816 | 3/1998 | Niijima et al. . |
| 5,740,349 | 4/1998 | Hasbun et al. . |
| 5,758,056 | 5/1998 | Barr . |
| 5,781,717 | 7/1998 | Wu et al. . |
| 5,877,986 | * 3/1999 | Harari et al. . |

OTHER PUBLICATIONS

Dipert, et al., "The Definitive Guide to Designing Flash Memory Hardware and Software for Components and PCM-CIA Cards," *Design with Flash Memory*, pp. 238–271 (1993).

* cited by examiner

Primary Examiner—Gopal C. Ray
(74) Attorney, Agent, or Firm—Christensen O'Connor Johnson Kindness PLLC

(57) ABSTRACT

A method, system and computer-readable medium for managing bad areas in flash memory. The flash memory is initialized by formatting the flash memory into a spare area and a data area with the spare area and the data area including a plurality of spare blocks and data blocks, respectively. In addition, spare blocks are grouped together forming a chunk. A working chunk map is created for storing format information and re-mapping information. The working chunk map includes a BBM header and a plurality of BBM entries that correspond to the spare blocks in each chunk. The working chunk map is written to one of the plurality of spare blocks in a chunk, designated as a copy chunk map. The working chunk map is also written to another one of the plurality of spare blocks in a chunk, designated as an original chunk map.

57 Claims, 17 Drawing Sheets

METHOD AND SYSTEM FOR MANAGING BAD AREAS IN FLASH MEMORY

FIELD OF THE INVENTION

The present invention relates generally to nonvolatile memory with flash erase capability, such as electrically erasable programmable read only memory (EEPROM, hereinafter referred to as a flash memory), and more specifically to a method and system for managing areas in the flash memory that are bad.

BACKGROUND OF THE INVENTION

There are several peripheral devices to a computer used for storing data, such as hard disk drives and floppy disk drives. Hard disk drives can be erased and programmed (written to) many times and, typically, can store a large amount of data. Floppy disk drives also can be erased and written to or programmed many times, but, typically, store a smaller amount of data. Another peripheral storage device used to store data is a Read Only Memory (ROM). A ROM is a solid state memory device that can be programmed only once and then read many times.

Recently, another solid state memory device, flash memory, has been developed for use as a storage medium. In order to use flash memory as a storage medium, a flash file system is used to manage the flash memory and to interface with the operating system of the host. Flash memory can be programmed and electrically erased many times. Typically, flash memory is erased using either a block erase or a chip erase process. When a block erase process is employed, areas of a flash memory chip array, called blocks, are simultaneously erased. When a chip erase process is employed individual chips are erased one at a time. In the following description, when referring to erasing an area of flash memory, the term block erase will be used.

While flash memory is a memory media that can be reprogrammed, prior to writing new data to a memory location that previously held data, the entire block that includes that memory location typically is erased to either an all 0 or an all 1 state. The only time erasing to an all 0 or all 1 state is not required prior to programming new data is when programming only involves changes from 1s to 0s in the all 1 state or from 0s to 1s in the all 0 state. The all 0 or all 1 state is referred to as the erased state and depends on the type of flash memory being used. The erasing of an entire block may take from several tens of milliseconds to several seconds. Furthermore, each time flash memory is erased and rewritten, the flash memory deteriorates. Once flash memory deteriorates to the point where the memory is no longer reliable or able to store data, that area of the flash memory is considered bad. Flash memory may be manufactured with bad areas and may develop bad areas for several other reasons well known to those familiar with flash memory.

Various methods of managing bad areas of flash memory have been proposed. One method copies control information describing the state of the flash memory from the flash memory into a RAM before erasing the flash memory area. After the flash memory area is erased, the control information is written back to the flash memory. This approach has the disadvantage that control information temporarily stored in the RAM is lost if a system failure, such as a power failure, occurs during erasure of the flash memory. The lost information is not recoverable. Another proposed method employs a separate controller and a more reliable secondary memory, such as an EEPROM. This method of managing the flash memory has the disadvantage of requiring extensive support hardware, which adds complexity and expense to the system employing the flash memory.

In summary, a need exists for a method of managing bad areas of flash memory such that information is reliably stored in the flash memory that does not require the use of extensive hardware. The invention is directed to fulfilling this need.

SUMMARY OF THE INVENTION

In accordance with this invention, a method, a computer-readable medium, and a system for managing bad areas in flash memory such that information is reliably stored in the flash memory that does not require extensive support hardware.

The flash memory is initialized by formatting the flash memory into a spare area and a data area with the spare area and the data area including a plurality of spare blocks and data blocks, respectively. In addition, a plurality of spare blocks are grouped together to form a chunk. Each chunk includes two chunk maps—an original chunk map and a copy chunk map. The original and copy chunk maps store format and re-mapping information. Each chunk map includes a bad block management (BBM) header and a plurality of BBM entries that correspond to the spare blocks in each chunk. The original and copy chunk maps are created and updated by creating a related working chunk map in temporary storage, e.g., RAM, and writing the working chunk map into one of the plurality of spare blocks to form the original chunk map and into another of the plurality of spare blocks to form the copy chunk map.

The present invention provides operational processing including: re-mapping of data contained in a block detected as having a bad area (called a bad block) to one of the plurality of spare blocks; and providing access information of a requested data block to a flash file system regarding a location for contents of the requested data block.

In accordance with other aspects of this invention, the BBM header includes a Status field and an In-Progress Index field and each of the plurality of BBM entries includes a Bad Data Block Number field.

In accordance with still further aspects of this invention, the re-mapping of data contained in a block detected as having a bad area (called a bad block) to one of the plurality of spare blocks includes finding the first available free BBM entry in the plurality of BBM entries in one of the chunks; reading the original chunk map associated with the chunk containing the first available free BBM entry (called a free entry original chunk map); and creating a free working chunk map with information from the free entry original chunk map. If the bad block is a bad spare block and in the chunk associated with free working chunk map, the BBM entry associated with the bad spare block is found and that BBM entry is marked as bad in the free working chunk map. Then, a number that identifies the bad data block that was re-mapped to the bad spare block is written into the Bad Data Block field of the free BBM entry. If the bad block is not in the chunk associated with the working chunk map, e.g., the bad block is a data block, the bad block number is written into the Bad Data Block Number field of the free BBM entry. Thereafter, the free entry original chunk map is erased and a 'Status Copy Invalid' value is written into the Status field. If the bad block is not in the current chunk and is not a data block, the bad block must be a spare block not in the current chunk. In this case, the chunk containing the bad block is found, the original chunk map for this chunk (called the bad block original chunk map) is read, and a current working chunk map is built using the data from the bad block original chunk map. Then the bad BBM entry associated with the bad block is found and marked as bad in the current working chunk map. Thereafter, the bad block original chunk map is erased and over written with the contents of the current working chunk map and a 'Status Copy Invalid' value in the Status field. Next the copy chunk map associated with the bad block (called the bad block copy chunk map) is erased and overwritten with the contents of the current working chunk map. Then a 'Status Copy Valid' value is written into the Status field of the original chunk map.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

As will be better understood from the following description, the present invention provides a system and method for managing bad areas of flash memory called Bad Block Management (hereinafter referred to as BBM). BBM efficiently handles bad areas of flash memory by re-mapping the bad areas to good areas without corrupting or losing any of the information stored in the flash memory. In addition, erase/write cycles for maintaining information about the status of the bad areas in the flash memory is minimized, a secondary controller and secondary storage is not needed to maintain the status of the bad areas and various flash file systems may be implemented with the BBM of the present invention.

Figure 1:
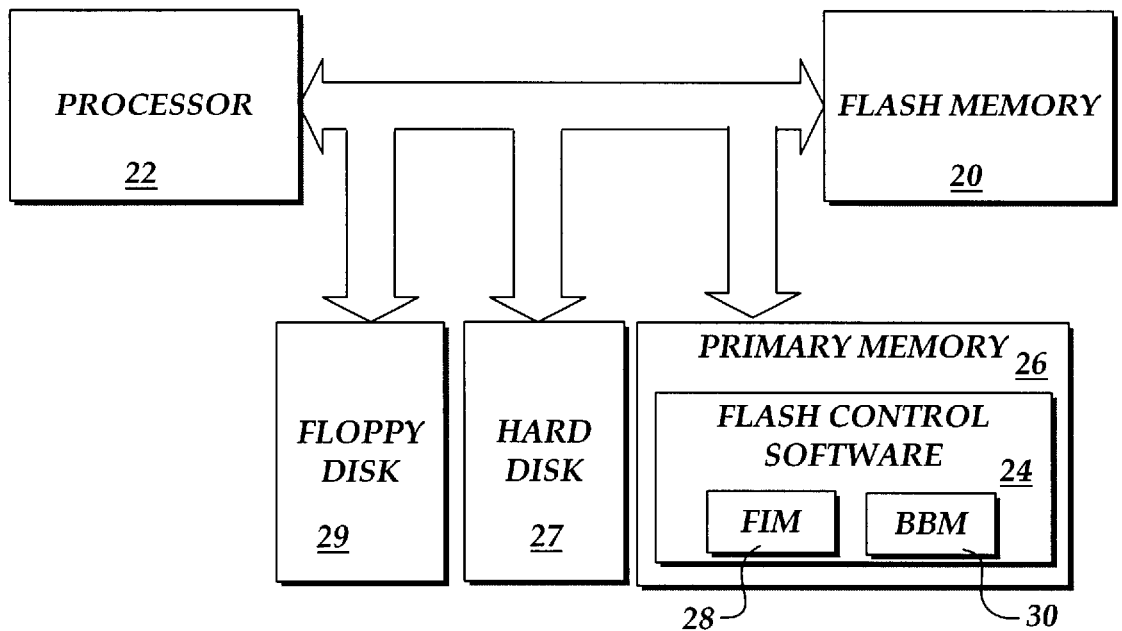
FIG. 1 is a block diagram illustrating the functional components of a system for implementing the present invention.

A block diagram of a system for implementing BBM in accordance with the present invention is shown in FIG. 1. The system shown in FIG. 1 comprises flash memory 20, a processor 22, primary memory 26, and other memory, such as a hard disk 27 and a removable magnetic disk, such as a floppy disk 29. The hard disk and the floppy disk should be construed as exemplary, not limiting. Some embodiments of the invention may include one, but not both. Other embodiments of the invention may include other storage media such as an optical disk, for example.

The processor 22 is programmed to control the access to information stored on the flash memory 20 using flash control software 24 that is resident in the primary memory 26 during the operation of the system shown in FIG. 1. In this regard, the primary memory 26 may include ROM and random access memory (RAM). The flash control software 24 includes a Flash Interface Module (hereinafter referred to as the FIM) component 28 and a BBM component 30. In addition, the flash control software 24 may further include a flash file system that organizes the flash memory so that the host system can access the flash memory for storing data, code, or other information. Typically, the flash file system includes a special driver that translates the sector addresses employed by the file operations of standard operating systems into physical memory addresses in the flash memory. An example of a flash file system is disclosed in co-pending U.S. patent application Ser. No. 08/623,661, filed Mar. 28, 1996, entitled METHOD AND APPARATUS FOR ALLOCATING STORAGE IN A FLASH MEMORY by K. B. Smith et al. The subject matter of this application is hereby incorporated herein by reference. Typically, at least some of the flash control software 24 may reside in ROM on the hard disk 27, the removable magnetic disk 29, or other computer-readable media (not shown). If stored in other memory, the BBM is loaded into the primary memory 26 for run-time operation. The present invention relates only to the BBM component 30 of the flash control software 24.

The FIM component 28 is the interface between the BBM component 30 and a host operating system. The FIM component 28 determines whether an area of the flash memory is bad. When the FIM component 28 detects a bad area, through use of error checking status from the flash memory or secondary Error Correcting Codes (ECC), the FIM component 28 requests the BBM component 30 to re-map the bad area to a good area in the flash memory 20.

Figure 2:
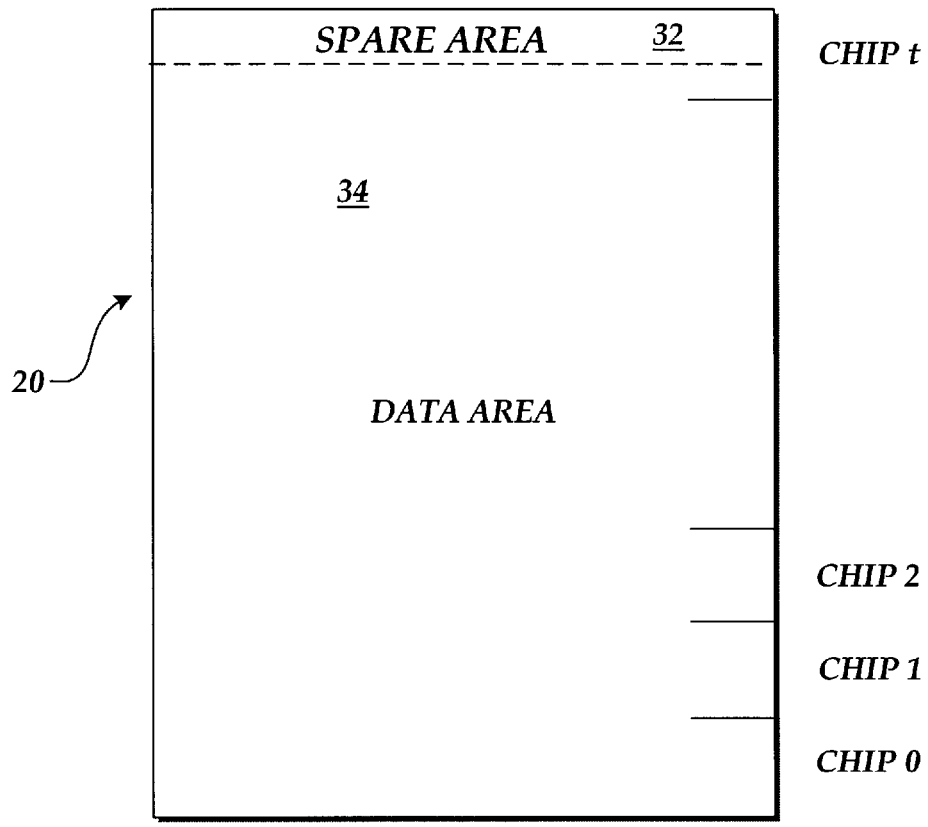
FIG. 2 is a block diagram of a flash memory divided into a spare area and a data area in accordance with the present invention.

As shown in FIG. 2, the flash memory 20 comprises a plurality of chips designated chip 0 through chip t. The plurality of chips, i.e., the flash memory, is divided into a spare area 32 and a data area 34. Preferably, the size of the spare area 32 is based on the reliability of the flash memory 20 being used. For example, if the chosen flash memory 20 has a 95% reliability rating, the spare area 32 would consume slightly more than approximately 5% of the entire flash memory 20. As a result, if the flash memory 32 is very reliable, the spare area 32 will comprise a relatively small percentage of the total flash memory 20. As shown, the spare area 32 resides on only one chip, chip t. Alternatively, the spare area 32 may reside in more than one chip. This would likely occur if the flash memory 20 is extremely large and the reliability rating dictates a percentage area larger than one chip. The separation of the flash memory into a spare area and a data area, in contrast to a spare area and data area in each block, allows the BBM to handle chips having more than an average number of bad areas more efficiently. A spare area allocated based on the average reliability of the chips is needed, rather than a spare area in each block that will accommodate re-mapping all bad areas within that block. As those skilled in the art will appreciate, the size of the spare area 32 can be arbitrarily set to any size, if desired.

Figure 3:
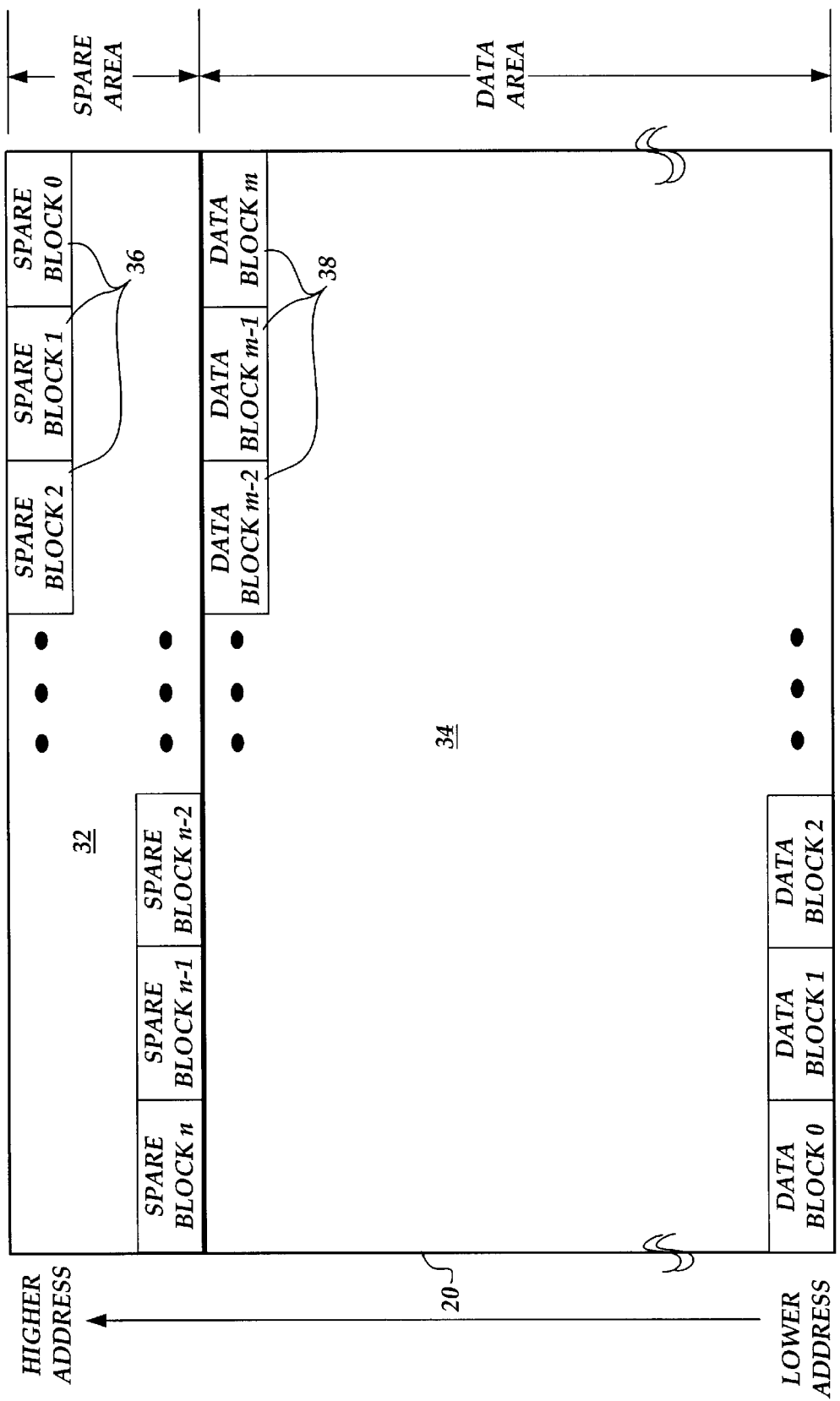
FIG. 3 is a block diagram of the spare area and data area shown in FIG. 2 divided further into a plurality of blocks in accordance with the present invention.

Referring to FIG. 3, the spare area 32 and the data area 34 of the flash memory 20 is shown in more detail. Both areas are divided into a plurality of blocks: spare blocks(0 to n) 36 and data blocks(0 to m) 38. The process for dividing the spare area 32 into the spare blocks 36 will be described in more detail later. Each block 36, 38 is a multiple of a physical erase block size determined by the flash memory manufacturer. Typically, blocks 36, 38 are the same size and equal to the physical erase block size. If desired, the blocks 36, 38 may be increased by a power of two to reduce the number of blocks required to be maintained by the BBM. For example, if the physical erase block size is 512 bytes, blocks 36, 38 may be sized to be 1024 bytes, 2048 bytes, 4096 bytes or any other power of two. As those skilled in the art will appreciate, the maximum size used for blocks 36, 38 depends on the reliability of the flash memory, the permanency of the data written on the flash memory, and other factors.

Figure 4:
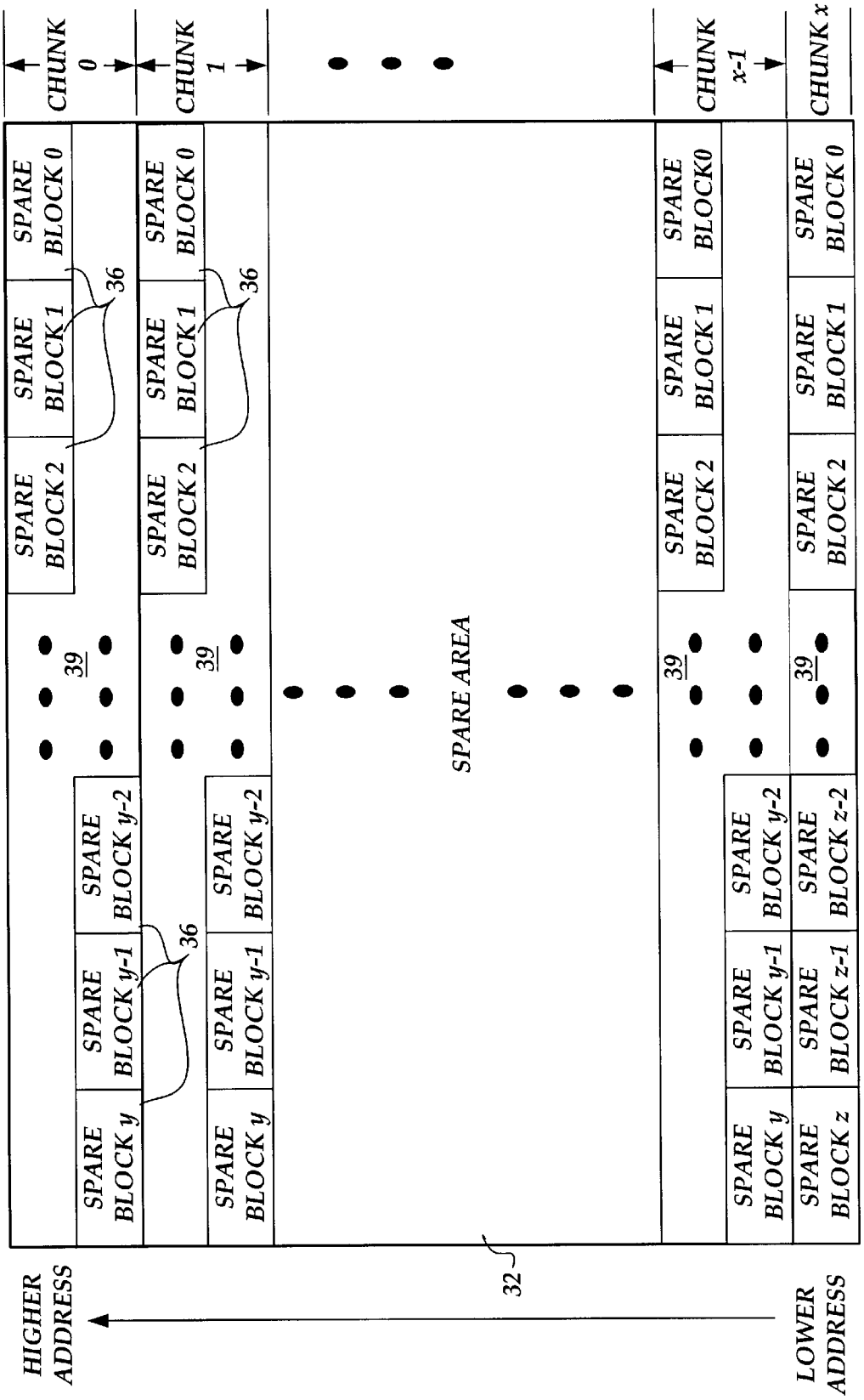
FIG. 4 is a block diagram of the spare area shown in FIG. 3, wherein the blocks are grouped into a plurality of chunks in accordance with the present invention.

Now, referring to FIG. 4, a block diagram of the spare area 32 is shown with the spare blocks 36 being grouped into a plurality of chunks 39. Each chunk 39 has the same number of spare blocks 36, except for the last chunk, chunk x, residing in the lowest address space of the spare area 32. Chunk x may have fewer spare blocks 36 depending on the allocated size for the spare area 32 and the size of the equal sized chunks 39. As will be described in more detail later, the BBM handles the occurrence of a smaller sized last chunk. The first chunk, chunk 0, is located in the highest address space of the spare area 32. The next chunk, chunk 1, is located in the next highest address space of the spare area 32 and so on with the last chunk, chunk x, located in the lowest address space of the spare area 32. Chunks 39 are allocated and formatted as needed during run time operation as will be described in more detail later. The grouping of the spare blocks 36 into chunks 39 allows the BBM to efficiently accommodate various sized flash memory without modification. The use of chunks 39 also minimizes the number of erase/write cycles to the flash memory required to maintain the status of bad areas and re-mapping bad areas to good areas. The minimization of erase/write cycles while allowing the BBM to adequately store necessary information on the flash memory reduces flash memory deterioration because flash memory deterioration is related to erase/write cycles. The more erase/write cycles per unit of time the faster flash memory deteriorates.

Figure 5:
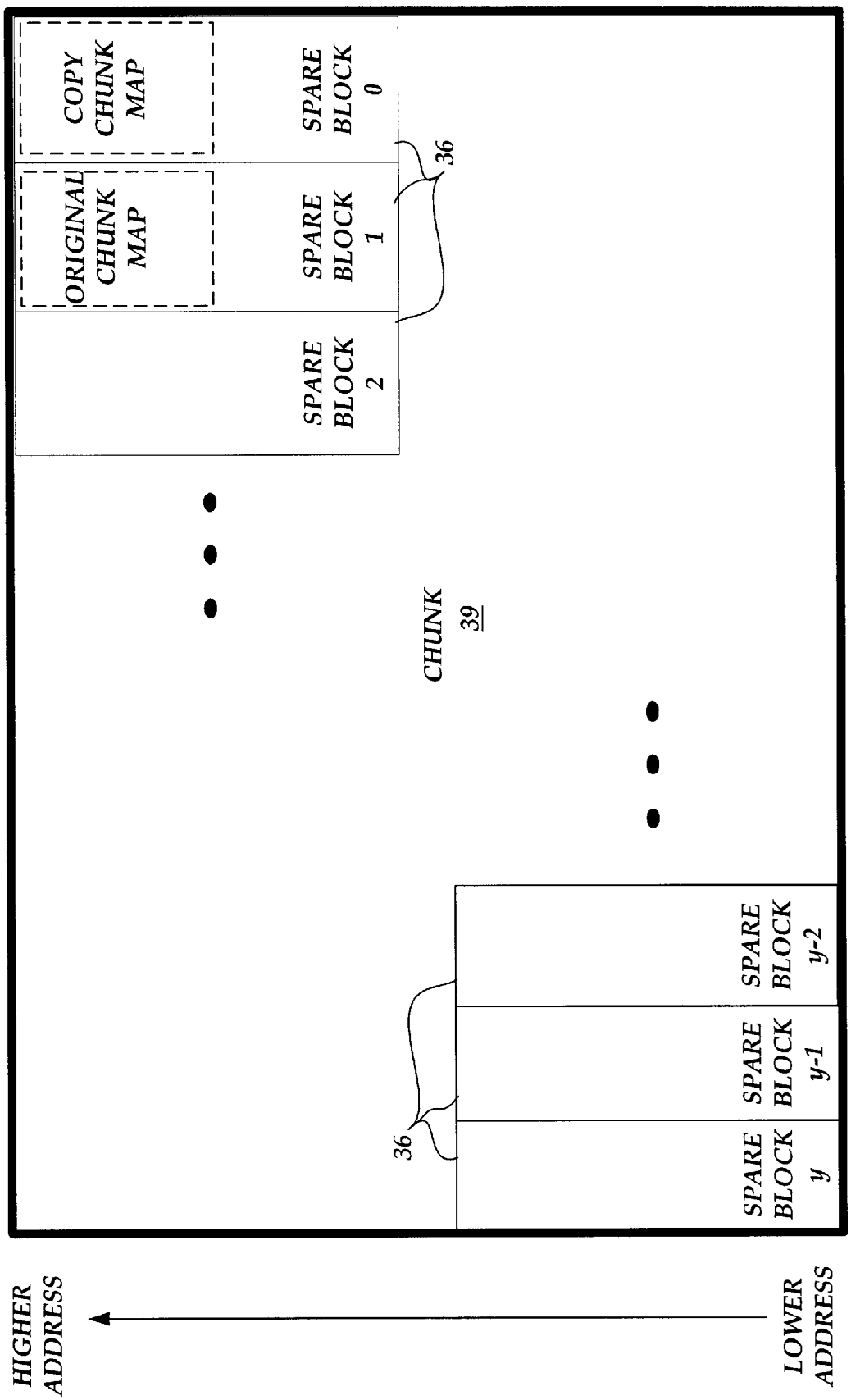
FIG. 5 is a block diagram of a chunk shown in FIG. 4 illustrating the copy chunk map and original chunk map in accordance with the present invention.

FIG. 5 is a block diagram of a chunk 39 that has been formatted using a process that will be described later in more detail. Each formatted chunk contains an original chunk map 40 and a copy chunk map 42 (hereinafter collectively referred to as the chunk maps). These chunk maps are located in consecutive spare blocks 36, initially having the highest available addresses in the chunk 39. Now, referring to FIG. 6, a format for the chunk maps is shown. The chunk maps 40, 42 include a BBM header 50 and BBM Block Map Entries 52. As shown on the right side of FIG. 6, the BBM Header 50 includes several data fields.

One field, a Signature field 60, stores an identifier that the BBM recognizes and uses to determine whether the flash memory has been formatted for BBM operation. More specifically, the Signature field 60 includes a plurality of bytes. The data contained in the bytes is used to create a unique BBM identifier. In one actual embodiment of the invention, the Signature field 60 has eight bytes. At least six bytes of the eight bytes must match in order for the header to be recognized by the BBM. If more than two bytes do not match, the header may be located elsewhere in the chunk, or the flash memory is not recognized as formatted for BBM operation. As a result, the flash memory is formatted. As those skilled in the art will appreciate, the number of bytes and the BBM identifier used are chosen to minimize the likelihood of falsely identifying the flash memory as formatted for BBM operation.

Another field, a Data Blocks field 62, stores the total number of contiguous data blocks 38 in the data area 34 available for storing client data. The term, client data, is used to refer to any data storage that is not BBM overhead data storage. The client data may be files, code, another file system, or any other representation of information. The Data Blocks field 62 may further include a parity field (not shown) that stores an odd parity of the value representing the total number of contiguous data blocks. The parity field provides the BBM the capability to perform additional validity checking. A Block Size field 64 stores the size of the blocks 36, 38 that are managed by the BBM. As mentioned earlier, the block size may be the physical erase block size or it may be a multiple of the physical erase block size.

Another field, a Status field 66, stores status information about the chunk map. A specific value (e.g., 0xFFFF) denotes that the chunk map is the copy chunk map 42. While a different value (e.g., 0xF0F0) denotes that an update to the chunk map is in progress. Another specific value (e.g., 0x0000) denotes that the copy chunk map 42 is fully valid and identical to the original chunk map 40. Preferably, the last two values appear in the original chunk map 40 and not in the copy chunk map 42. The use of these values will be described in more detail later.

A Data Block Copy field 68 stores a copy of the above-described Data Blocks field 62 that the BBM uses to improve reliability. Likewise, a Block Size Copy field 70 stores a copy of the above-described Block Size field 64. A Map Size field 72 stores the number of bytes allocated to each BBM chunk map. In one actual embodiment of this invention, the map size field stores the number 512, representing that each chunk map is 512 bytes. As will be explained in more detail later, the data stored in the Map Size field 72 determines the number of spare blocks 36 grouped into each chunk 39. The Map Size field contents may also be adjusted to reduce the overhead in primary memory. Another field, an In-Progress Index field 74, stores an update condition for each of the chunk maps. Briefly, the In-Progress Index field is used in the event an interruption occurs during a re-mapping of a bad area to a good area. An index value corresponding to the spare block being updated is stored in the In-Progress Index field 74. As will be described in greater detail later, the BBM uses the index value to determine the bad data area being replaced into the spare area. A Reserved field 76, currently unused, is available for additional information storage.

The above described fields, along with redundant copies of the chunk map, insure that a data block that is placed into the spare area will not become lost or corrupted. Using redundant chunk maps with appropriate fields, allows the BBM to reliably store all necessary flash memory status information on the flash memory itself. This allows the flash memory to be a self-contained unit that can be easily transported to another system. The present invention avoids using a separate non-volatile storage device to store the status of the flash memory during run-time.

Referring again to FIG. 6, the BBM Block Map Entries 52 of the chunk map is now described in more detail. The BBM Block Map Entries 52 is an array of BBM entries 78 (represented as BBM entry 0 to y). Each BBM entry 78 includes a Bad Data Block Number field 79 and a Valid field 80. The number of BBM entries 78 is the same as the number of spare blocks 36 in each chunk 39 and are associated by their respective index values. For example, BBM Entry 0 in the chunk map describes the block with the highest address within the chunk, spare block 0 as shown in FIG. 5. Each of the spare blocks within the chunk are numbered from the highest address block to the lowest address block.

As briefly mentioned above, the chunk map size is the same for both the original chunk map 40 and the copy chunk map 42. The chunk map size determines the number of spare blocks that can be described by a single chunk map. For example, if the chunk map size is 512 bytes, the total number of spare blocks 36 within the chunk 39 is determined by the following equation: (Map Size−Header)/BBM Entry size. For example, if the header size is 32 bytes and the single BBM Entry size is 4 bytes, the number of BBM blocks that can be described by a single 512 byte chunk map is 120.

The BBM entries 78 provide a mechanism for the BBM to associate unused spare blocks with bad data blocks 38 (i.e., re-map bad data blocks to spare blocks). The data that is stored in the Bad Data Block Number field 79 is the block number of the bad data block. As mentioned earlier and described in more detail in the above referenced co-pending application, the block number is the translated physical address requested by the operating system or application. This mapping allows a physical memory address of the flash memory to be accessed in response to the operating system seeking data stored at a particular memory sector location. The Valid field 80 is used to identify bad spare blocks 36 in the chunks 39.

As will be described in more detail later, the BBM scans through the BBM entries 78, looking for a bad block number that corresponds to the client data being requested by the processor 22. If the desired bad block number is found, the BBM uses the index (0 to y) of the BBM entry to locate the spare block 36 (0 to y) having the same index within the same chunk 39 and obtains the desired client data from the spare block rather than the bad block.

Figure 7:
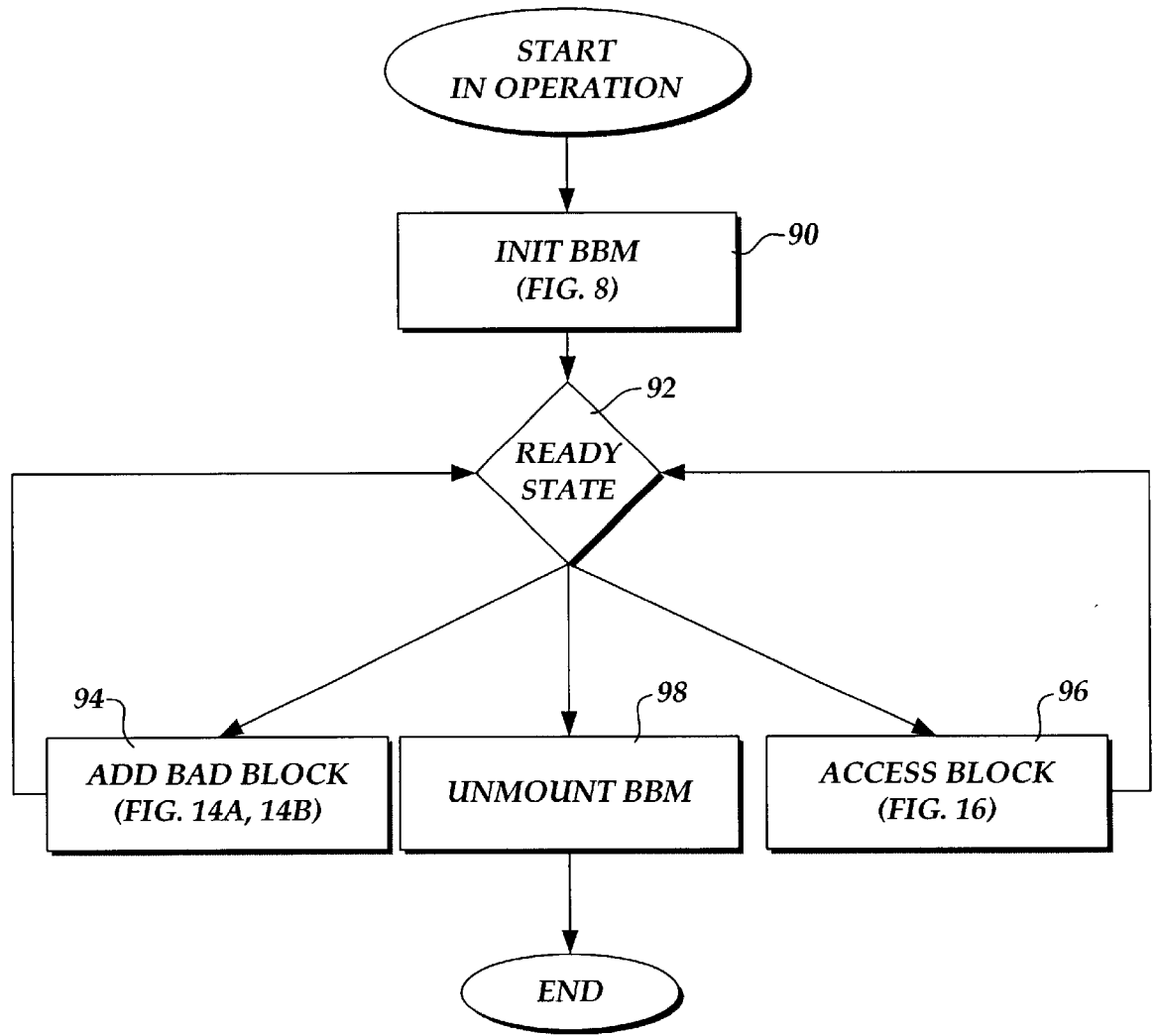
FIG. 7 is a flow diagram illustrating an overview of the BBM processes of the present invention.

FIGS. 7–16 illustrate in flow diagram form how the flash memory is formatted and initialized with the BBM and how the BBM handles bad areas in the flash memory during operation. FIG. 7 is an overview of the BBM processes. At block 90, the BBM is initialized. This occurs when power is turned on or as the first step when the host system requests BBM processing.

Figure 8:
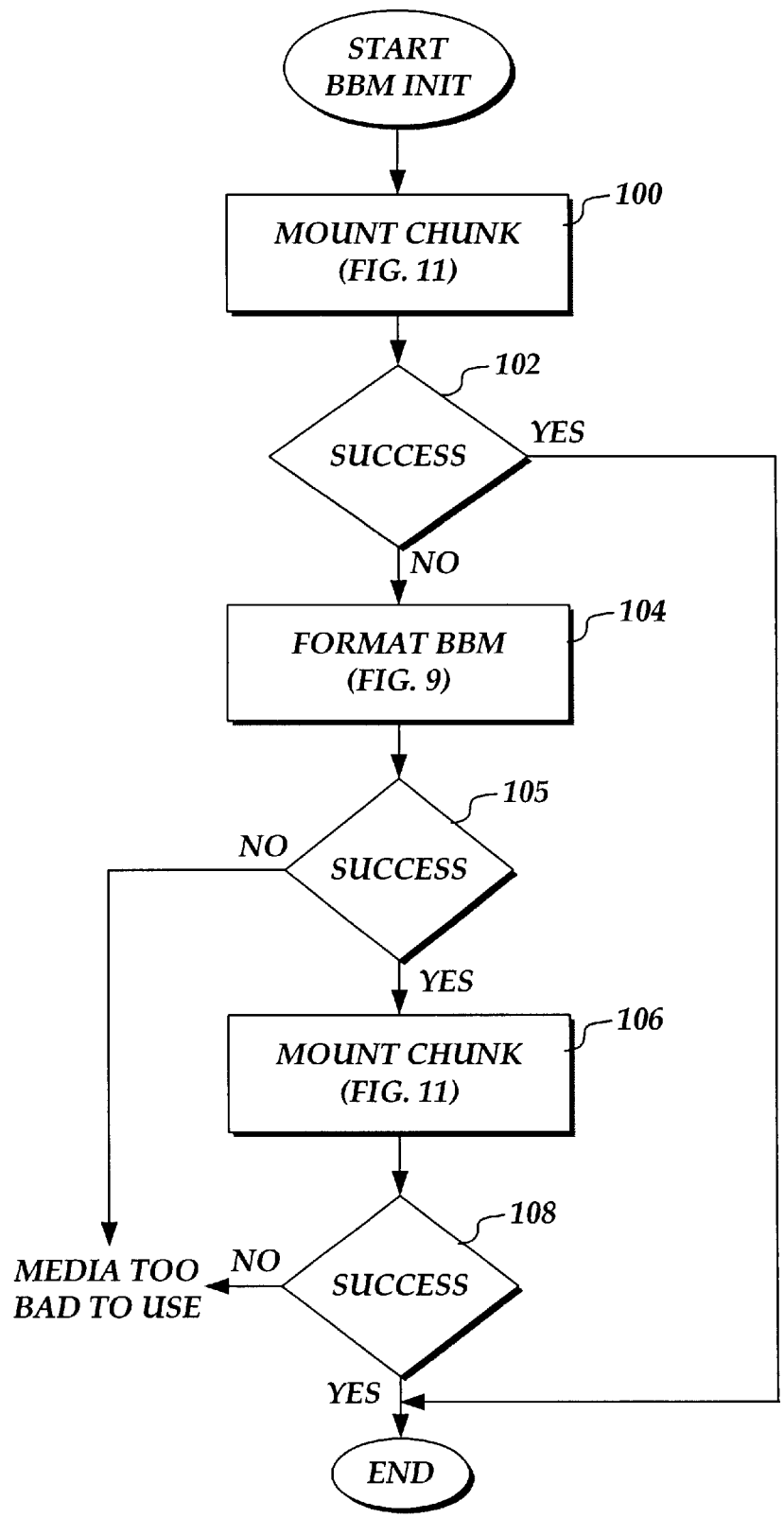
FIG. 8 is a flow diagram illustrating an overview of the initialization process of the present invention.

FIG. 8 is an overview of the initialization process of the present invention. Starting in block 100, the BBM attempts to mount a chunk of the flash memory. The details of the processing occurring in block 100 will be described later in more detail. Therefore, proceeding to decision block 102 and assuming that the flash memory is new (or badly corrupted), the BBM detects that the mount was unsuccessful. The logic then proceeds to block 104 to where the flash memory is formatted for BBM operation.

Figure 9:
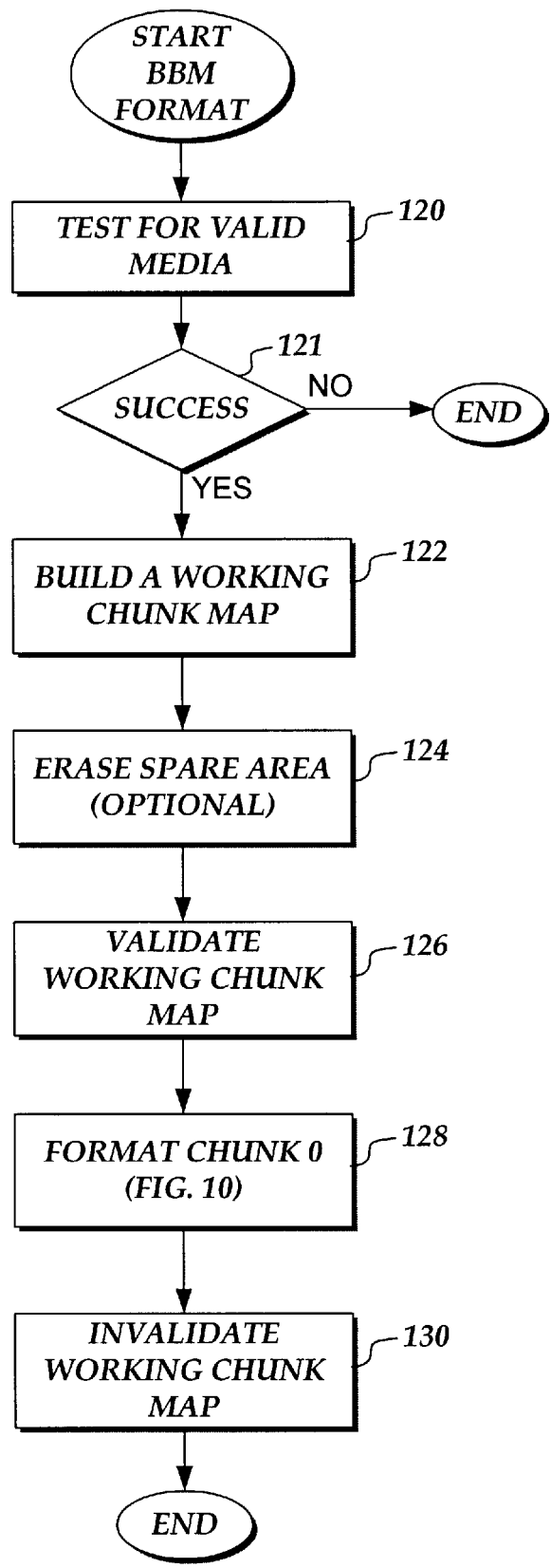
FIG. 9 is a flow diagram illustrating a process of formatting the flash memory suitable for use in the process shown in FIG. 8.

FIG. 9 is a detailed flow diagram illustrating how the flash memory is formatted for BBM operation. At block 120, the flash memory is tested to see whether it is a valid media. This testing may include determining whether the flash memory is available, whether the flash memory is the right size, or whether it has the right erase block size. As those skilled in the art will appreciate, testing to determine whether the flash memory is a valid media may be implemented in a variety of ways. After testing for a valid media, the logic proceeds to decision block 121. If the media was not valid, the BBM does not attempt to format the media, but rather provides a proper notification of the error. However, if the media is found to be valid, the BBM logic proceeds to block 122 where a working chunk map is built having a BBM Header. In one actual embodiment of the present invention, the working chunk map is resident in RAM so that access to the BBM header is faster. Once the working chunk map is created, the entire spare area may optionally be erased. See block 124. While it is not necessary that block 124 be performed, it is preferred to erase the entire spare area so that old format information from a previous format (i.e. BBM or other) will not cause any problems. Next, at block 126, the working chunk map of the BBM Header created in block 122 is validated by setting a variable. This validation allows other BBM processes to know the current state of operation. Chunk 0, the chunk with the highest address space, is then formatted at block 128. The formatting of chunk 0 is illustrated in detail in FIG. 10.

Figure 10:
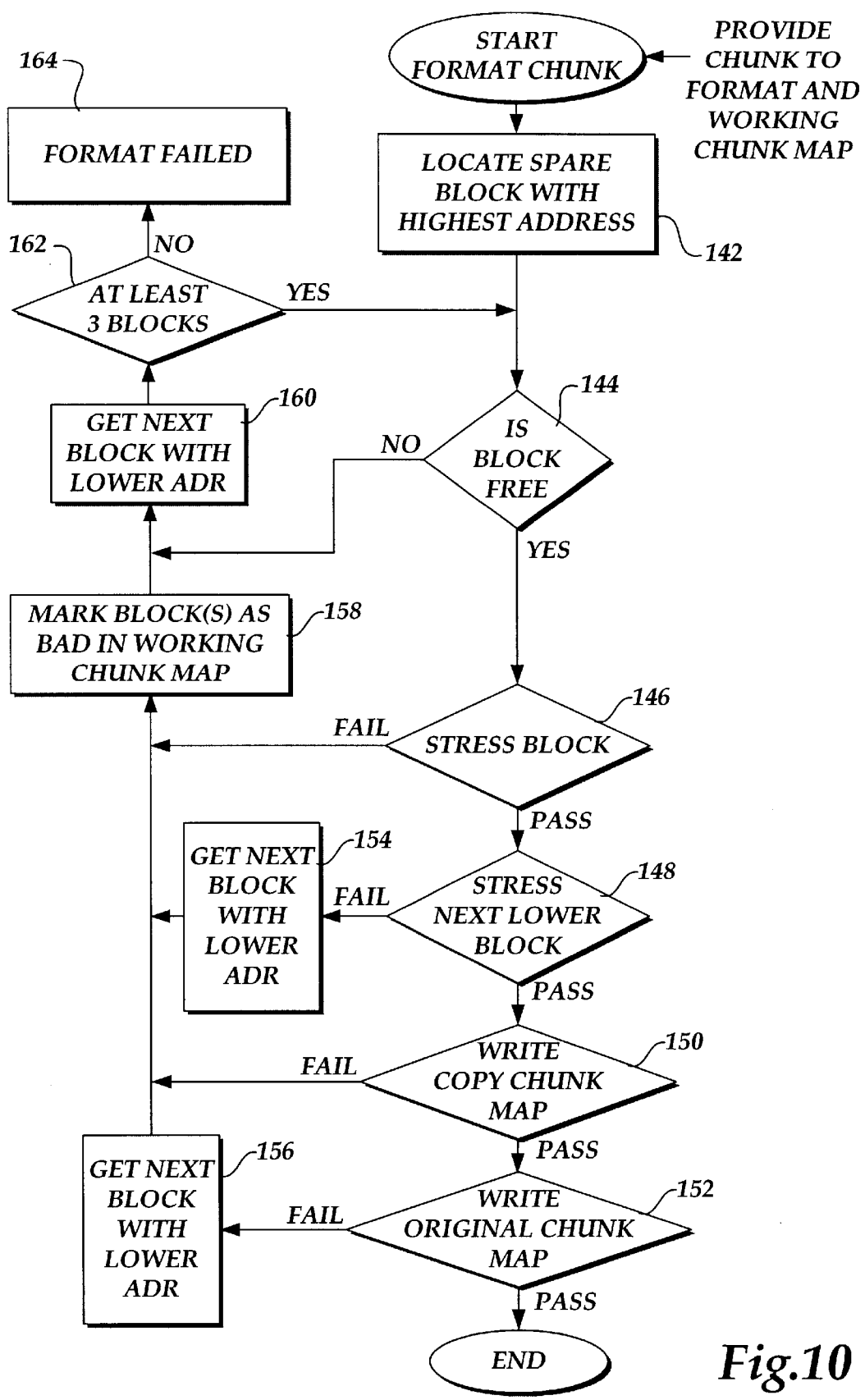
FIG. 10 is a flow diagram illustrating a process of formatting a chunk suitable for use in the process shown in FIG. 9.

The process shown in FIG. 10 begins with the receipt of a chunk number to format and a working chunk map. Briefly, when formatting a chunk, the BBM searches for the two highest consecutive free spare blocks that are good. The BBM then writes the chunk map BBM Header data into these two spare blocks as the copy chunk map BBM Header and the original chunk map BBM Header. If the BBM entries for a chunk have been completely used to re-map data blocks or are found to be referencing bad spare blocks, the BBM will allocate another chunk, search the chunk for two free spare blocks and write the chunk map BBM Header data into the two free spare blocks as the original chunk map BBM Header and copy chunk map BBM Header. Typically, the last chunk that is allocated will often not be the same size as the earlier chunks because there are insufficient blocks remaining to make a chunk with the same size. In the presently described embodiment, as long as there are three blocks available in a chunk, the format will be successful. One skilled in the art will appreciate that any number of good blocks (0–n) may be used to format a chunk.

This process is illustrated in detail in FIG. 10. At block 142, the spare block with the highest address in the chunk is located. The logic then proceeds to decision block 144, where the BBM determines if the block is free by checking the BBM entry associated with the block in the working chunk map. If the block is free, the logic proceeds to decision block 146 where the BBM determines if the free block can pass a stress test. A stress test refers to the testing of memory which is well-known in the art. It is typically implemented by writing several alternating bit patterns and then verifying these bit patterns by reading the same memory locations to determine if the bit pattern read is the same as the one written. Typical bit patterns are 0x55, 0xAA, and then 0x00. If the spare block passes the stress test, the logic proceeds to decision block 148 where the next lower spare block in the chunk is tested to determine if it can pass a stress test. If this next lower block also passes the stress test, two consecutive free blocks that are good have been located. The logic then proceeds to decision block 150 where the working chunk map BBM header is written into the higher of the two spare blocks as the copy chunk map. As stated earlier, in the present embodiment of the invention, the copy chunk map is stored in the higher of the two consecutive spare block addresses. Conversely, as those skilled in the art will appreciate, the relative location and order of the chunk maps within the chunk may be different. All that is required is that the BBM knows the location and order of the original chunk map and the copy chunk map.

Returning to FIG. 10, if the writing of the copy chunk map of the BBM header to the next lower spare block is successful, the logic proceeds to decision block 152 where the working chunk map BBM header is written into the lower of the two spare blocks as the original chunk map. If this writing is successful, chunk formatting is complete and the process shown in FIG. 10 ends. The order of the operations during the format chunk process allows the BBM to detect a failure at any point in the format process and allows the BBM to successfully complete the operations at a later time.

Returning to decision block 146, if the first located free block failed the stress test, the BBM logic proceeds to block 158 where the failed block is marked as bad in the working chunk map of the flash memory. As described earlier in FIG. 6, in the present embodiment, a block is marked bad by programming the valid bit to zero in the BBM Entry associated with the block. Thereafter, the logic proceeds to block 160 where the free block with the next lower address is identified by the BBM. Because the BBM will skip over the first stressed block in the chunk, the two chunk maps will reside in other spare blocks, such as spare block 1 and spare block 2 instead of spare block 0 and spare block 1, as shown in FIG. 5.

After the free block with the next lower address is located, the BBM logic proceeds to decision block 162 where a test is made to determine whether there are at least three free blocks in the chunk. In the embodiment of the invention being described, three blocks is the minimum necessary to format a chunk: one for the copy chunk map; one for the original chunk map; and one spare block to map a bad data block. If three blocks are not available, the logic proceeds to block 164 and chunk formatting fails. Because the BBM is currently being described for formatting the first chunk, all but the last two spare blocks would need to fail the stress test before formatting fails. If this occurs, preferably, the BBM is alerted that the flash memory may not be usable. In any event, if at least three free blocks are available, the logic proceeds to decision block 144 and processing proceeds in the manner described earlier.

As with the stress block test, block 146, if there is a failure in any of the decision blocks 148, 150, and 152, the logic proceeds to block 158 and processing proceeds in the manner described above. If the tests performed by either decision block 148 or 152 fails, the spare block with the lower address is bad. If this situation occurs, both the lower and higher spare blocks are skipped and marked as bad in the working chunk map. See blocks 154 and 156. Both the lower and higher spare blocks are marked as bad so that no gaps occur in the BBM entries. This provides a more efficient searching method. However, one skilled in the art will appreciate that only the failed block needs to be marked as bad and the other block map may be used later to reference a bad data block.

If the test conducted in block 144 is failed, i.e., the block being tested is not free, the process cycles to block 160 where the block with the next lower address is located.

Returning to FIG. 9, after formatting chunk 0, the logic proceeds to block 130 where the working chunk map is invalidated so that other operations will not use the working chunk map. Then, returning to FIG. 8, after flash memory BBM formatting is finished (block 104), a mount chunk process is performed. See block 106.

Figure 11:
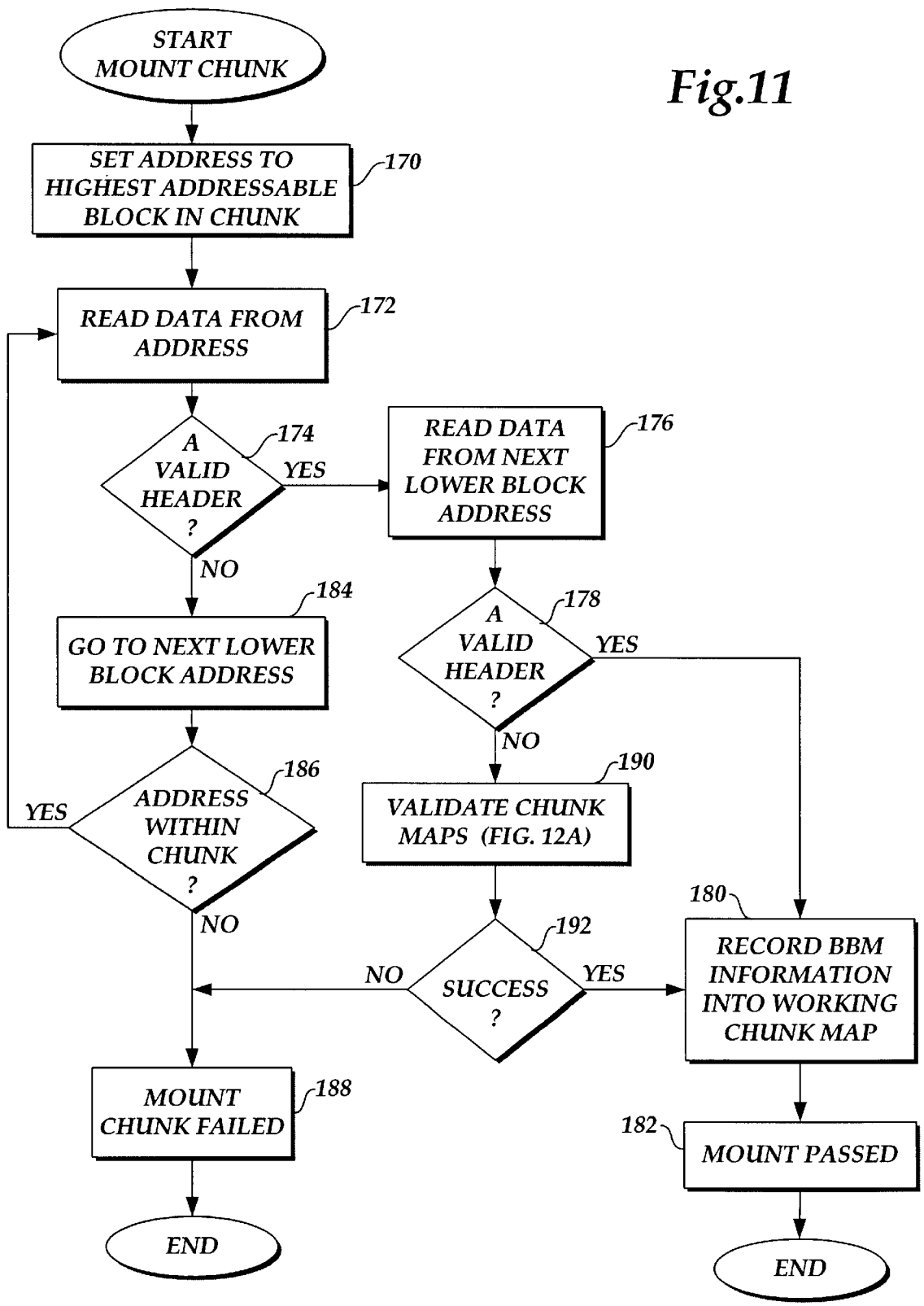
FIG. 11 is a flow diagram illustrating a process of mounting a chunk suitable for use in the processes shown in FIG. 8, 15 and 16.

FIG. 11 is a detailed flow diagram showing the mount chunk process. Briefly, when a chunk is mounted, the number of the chunk to be mounted is provided as input. The logic attempts to locate a valid BBM Header and to record the BBM Header into the working chunk map. If the mount chunk process is successful, the working chunk map is validated so other BBM processes that rely on the working chunk map know that their individual operations can be performed.

As shown in FIG. 11 at block 170, the address of the highest addressable spare block (spare block 0 in FIG. 4) in the chunk is set. After this address is set, the logic proceeds to block 172 where the data stored in the block located at this address is read. Typically, because the chunk maps are located in the highest two consecutive spare blocks, the data read includes a BBM Header. In decision block 174, the BBM determines whether the data read is a valid copy chunk map BBM Header. The determination uses various fields of the BBM Header. If the data read includes a valid header, the BBM logic proceeds to block 176, where data from the next lower spare block address is read and, then, to decision block 178 where the BBM determines whether the data read from the next lower block address includes a valid header. If the data includes a valid header, indicating that both chunk maps have been found and are valid, the logic proceeds to block 180 where the BBM Header information is recorded into the working chunk map. The logic then proceeds to block 182 where an indication that the BBM passed the mount chunk process is generated. Thereafter, the mount chunk process ends.

Returning to decision block 174, if the data read from the highest addressable spare block in the chunk did not contain a valid BBM header, the logic proceeds to the next lower spare block address (block 184). Next, the BBM determines whether the next lower spare block address is lower than the lowest addressable spare block available in the current chunk. See decision block 186. If the next lower block address is lower than the lowest addressable spare block available in the chunk, the logic proceeds to block 188 where an indication that the mount chunk process has failed is produced. In this situation, certain processing within the chunk is not allowed to take place because the working chunk map is not valid. However, if the next lower spare block address is not lower than the lowest spare block address available in the current chunk (decision block 186), the logic cycles back to block 172. At block 172, data from the block having the next lower block address is read, thus, continuing the search for at least one valid BBM Header. After data from this block is read, the logic proceeds as above-described.

Returning to decision block 178, if a valid header is not found, the logic proceeds to block 190 where the chunk maps are validated. In this situation, an error or interruption occurred that caused the chunk maps not to be redundant valid copies. As shown in FIG. 11, proceeding to block 190 indicates that the original chunk map is valid and the copy chunk map is invalid or the original chunk map is invalid and the copy chunk map is valid.

Figure 12A:
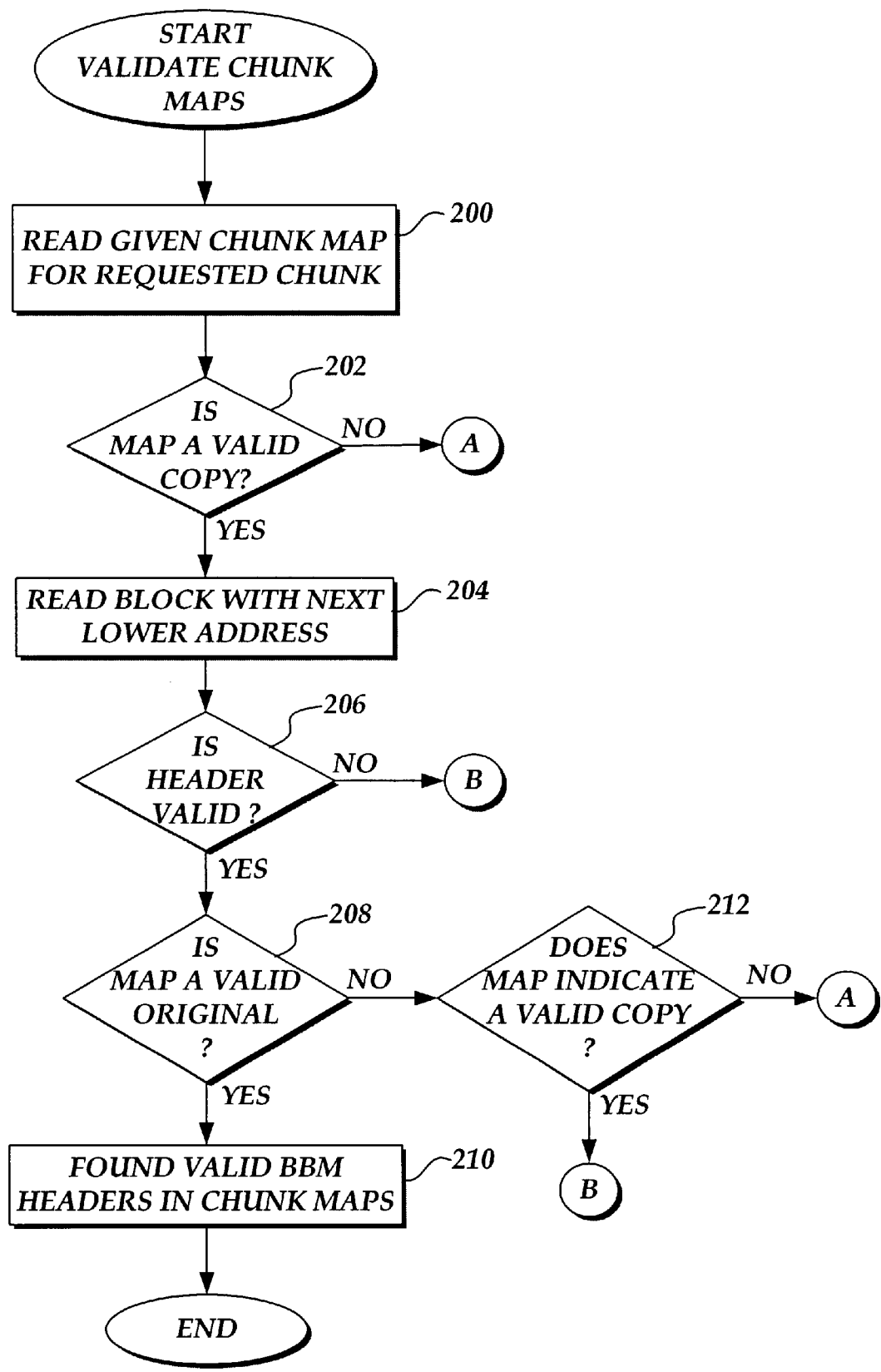
FIGS. 12A–12C are flow diagrams illustrating a process of validating and updating the chunk maps suitable for use in the process shown in FIG. 11.
Figure 12B:
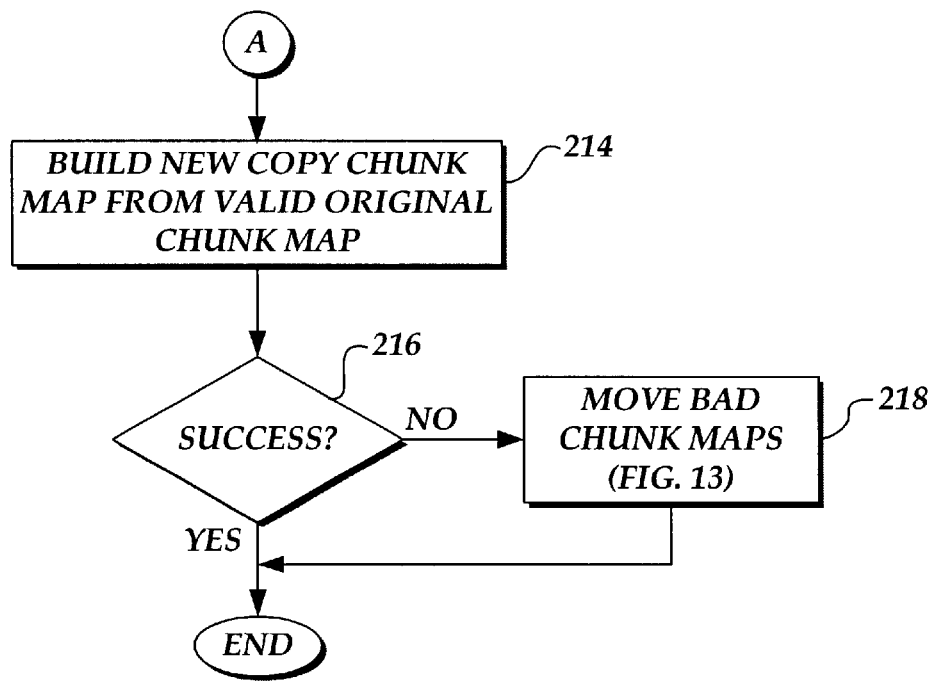
Figure 12C:
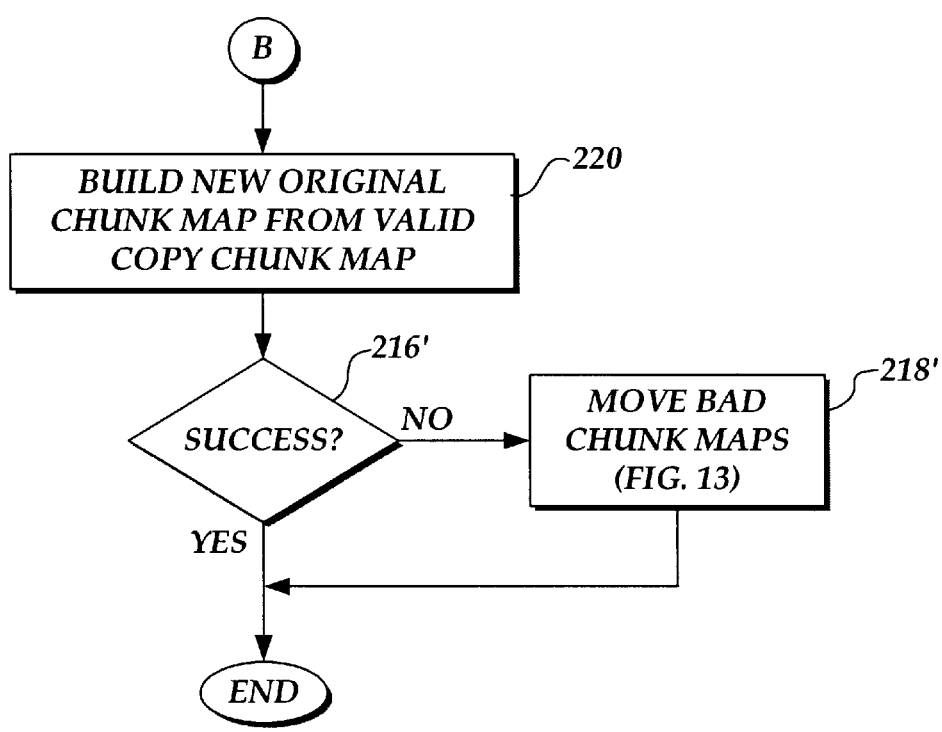

FIGS. 12A–12C form a flow diagram illustrating the chunk map validation process. First, at block 200, the chunk map of the chunk whose map is to be validated is read. The data read may be the original chunk map or the copy chunk map. Next, at decision block 202, the BBM determines if the chunk map is a valid copy. This determination analyzes the data stored in the Status field of the BBM header, described earlier. If the chunk map is a valid copy chunk map, the logic proceeds to block 204 where the spare block with the next lower address is read. Next, at decision block 206, the BBM determines whether the data read from this data block includes a valid header. If the data includes a valid header, the logic proceeds to decision block 208 where the header data is tested to determine if the chunk map is a valid original chunk map. If the BBM determines that the chunk map is a valid original chunk map, the logic proceeds to block 210 where a notification is provided that valid original chunk map and copy chunk map BBM headers were found. Validate chunk map processing then ends. If the map is not a valid original (block 208), a test is made to determine if the data read indicates a valid copy chunk map. See block 212.

If at blocks 202 or 212, the BBM Header did not identify a valid copy chunk map, the logic proceeds to FIG. 12B. If at blocks 206 or 212 the BBM Header did not identify a valid header (block 206) or the data read indicated that the copy chunk map was valid (block 212) the logic proceeds to FIG. 12C.

At block 214 of FIG. 12B, a new copy chunk map is built using the valid original chunk map. As those skilled in the art will appreciate, the validity of the original chunk map is determined before performing the necessary copying. Necessary flags are set indicating which chunk map is being validated. The logic then proceeds to decision block 216 where the BBM determines whether the building of the new copy chunk map from the valid original chunk map was successful. If successful, the validate chunk map processing ends. However, if the building of the new chunk map is not successful, the logic proceeds to block 218 where bad chunk maps within the chunk are moved.

Figure 13:
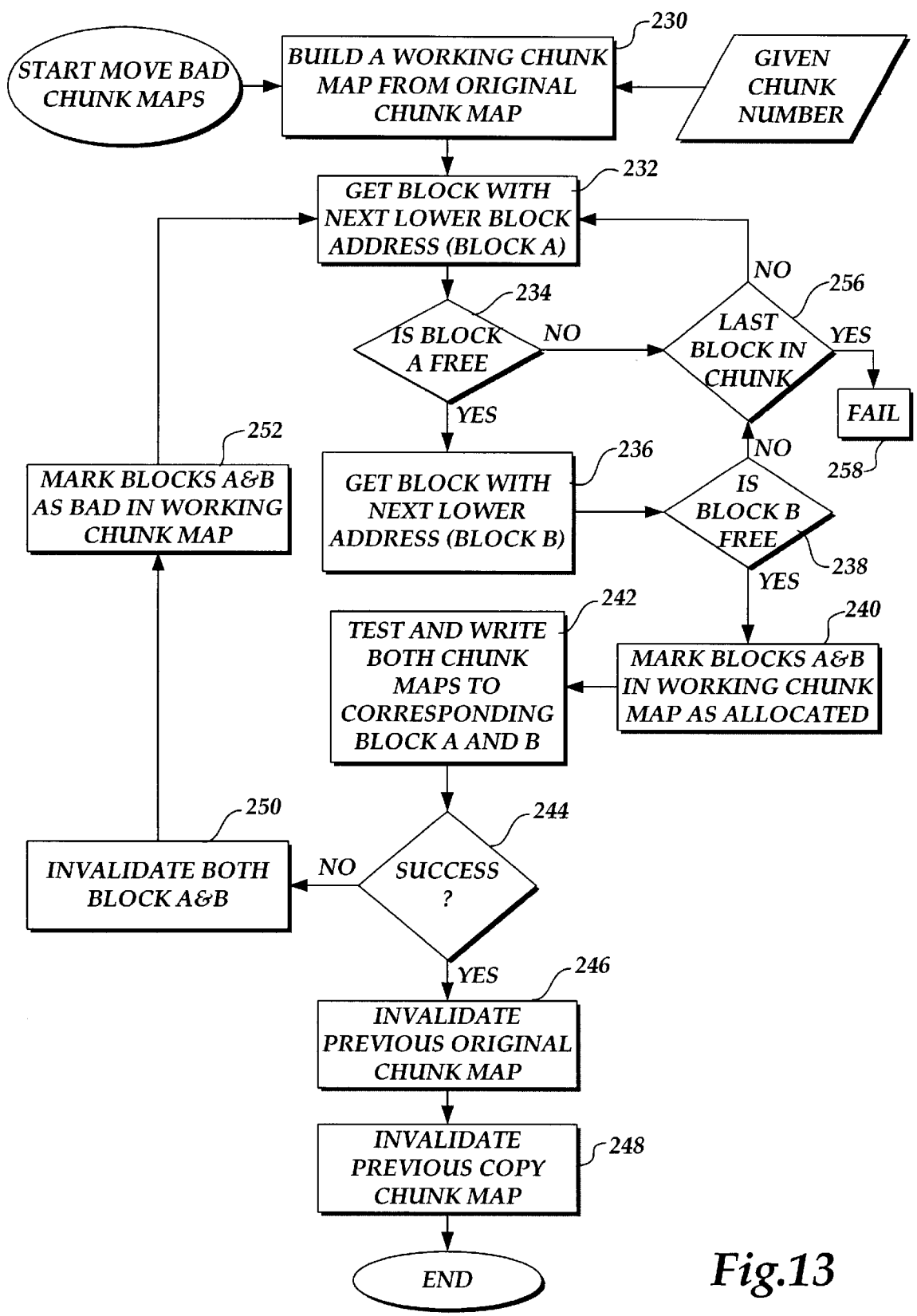
FIG. 13 is a flow diagram illustrating a process of moving bad chunk maps suitable for use in the process shown in FIGS. 12B and 12C.

FIG. 13 is a detailed flow diagram illustrating the process for moving bad chunk maps within a chunk. The order of the updates to the chunk map during the move bad chunk process allows the validation of the chunk maps to be 100% reliable. Briefly, bad chunk maps are moved when a chunk map resides in a bad block of flash memory. The spare block needs to be marked as bad and both chunk maps must be moved to new blocks if the preferred placement of the original chunk map and the copy chunk map reside in two consecutive good blocks. Any problems that are detected are stored in the BBM Header associated with the new chunk maps. Because flash memory may fail at any time, the move bad chunk map process is fully fault-tolerant. Any interruptions that can cause the old chunk maps to disappear, can be fixed at a later time, during a pass through the mount chunk process (FIG. 11).

Now, referring to FIG. 13, the number of the chunk having an invalid chunk map is provided. At block 230 a working chunk map of the original chunk map is built. This working chunk map can be built from a partial chunk map because of the redundancy of data in the two chunk maps and the redundancy of fields in each chunk map. Next, at block 232, the spare block having the next lower block address than the current original chunk map (designated Block A) is determined. The BBM then determines whether Block A is a free spare block. See decision block 234. This test is performed by analyzing the BBM entry associated with Block A. If Block A is determined to be free, the logic proceeds to block 236 where the spare block having the next consecutive lower address (designated Block B) is determined. As mentioned earlier, in the herein described embodiment of this invention, the BBM requires that the two chunk maps be in consecutive spare blocks. At block 238, a test is made to determine whether Block B is free (i.e. a good block and not currently used to re-map a bad data block). If Block B is free, the logic proceeds to block 240 where both Blocks A and B are marked as allocated in the working chunk map. Marking the blocks as allocated involves setting the BBM entries corresponding to Blocks A and B with a value indicating that the associated spare blocks contain a chunk map.

Next, the working chunk map is written into both Blocks A and B and the Status field is set to designate the chunk map as an original chunk map or a copy chunk map, as appropriate. The chunk maps are written in a fully fault tolerant manner described in detail below. As mentioned earlier, updating the chunk maps in this manner insures that an interruption will not cause any loss of information. At decision block 244, a test is made to determine if the writing of the chunk maps was successful. If the writes were completed successfully (i.e. the chunk maps were moved successfully), the logic proceeds to blocks 246 and 248 where the original chunk map and copy chunk map are invalidated, respectively. The move bad chunk maps process then ends.

If the writing of the chunk maps was not successful (decision block 244) indicating a bad spare block, the logic proceeds to block 250 where Blocks A and B are invalidated. The logic then proceeds to block 252 where both spare block(A&B) are marked as bad in the working chunk map. As mentioned earlier, both spare blocks are marked as bad so that no gaps occur in the BBM entries. This provides a more efficient searching method. However, one skilled in the art will appreciate that only the failed block needs to be marked as bad and the other block may be used later to reference a bad data block. The move bad chunk maps process then cycles to block 232 and continues in the manner described above.

If either Block A, in decision block 234, or Block B, in decision block 238, is determined not to be a free block, the logic proceeds to block 256 where the respective block is checked to see if the block address is the lowest addressable spare block in the chunk. If the block is the lowest addressable spare block in the chunk, the move bad chunk maps process signals a failure. See block 258. In this circumstance, the contents of the chunk are still usable (i.e., readable). Bad blocks can no longer be re-mapped to spare blocks within this chunk. However, if the block is not the lowest addressable spare block in the chunk, the next lower block address is found and designated Block A (block 232) and the move bad chunk maps process proceeds in the manner described above.

Returning to FIG. 12B, after the bad chunk maps have been moved (block 218), the validate chunk maps process ends.

The logic for updating the chunk maps when the original chunk map is invalid, shown in FIG. 12C, is similar to the logic for updating the chunk maps when the copy chunk map is invalid, shown in FIG. 12B. The only difference is in the initial step at block 220. In this step, a new original chunk map is built from the valid copy chunk map. After this initial block, the processing proceeds as illustrated in FIG. 12B and described above. As mentioned earlier, processing in FIG. 12B and 12C occurs after decision blocks 202, 206 and 212 indicating that one of the chunk maps is not valid. After completing the processing shown in FIG. 12B or 12C, the validate chunk maps process ends.

Returning to FIG. 11, after the validate chunk maps process is completed and the chunk maps updated (block 190), the logic proceeds to decision block 192 where a test is made to determine whether the validate chunk maps process was a success. If the validate chunk map process was not a success, the logic proceeds to block 188 where the mount chunk failure indication is produced. The process then ends. If, however, the validate chunk maps process was successful, the logic proceeds to block 180 where the BBM information is recorded into the working chunk map. The performance of this step allows other processes to use the working chunk map to perform their process. After recording the BBM information into the working chunk map, the logic proceeds to block 182 where the mount chunk process passed indication is produced. The mount chunk process then ends.

Returning to FIG. 8, after the chunk is mounted (block 106), the logic proceeds to decision block 108 where a test is made to determine whether the mount was successful. If the mount was successful, the BBM initialization process ends. However, if the mount was not successful, the BBM provides an indication that the media is too bad to use. Then the BBM initialization process ends.

After the flash memory has been formatted with the BBM Header, the flash memory is ready for operation. As mentioned earlier, the BBM component of the flash control software interfaces with the FIM component to provide full access to the flash memory. Typically, within the FIM component, a flash file system organizes the flash memory so that the host system can access the flash memory for storing data, code, or other information. Typically, the flash file system requires a special driver to translate standard file addresses into physical flash memory addresses.

Returning to FIG. 7 (block 90), after the BBM is initialized as described above with reference to FIGS. 8–12, the BBM is in a ready state (block 92). This means that the flash memory has been formatted with the BBM information, the BBM has been mounted and there is no current BBM processing being performed. From the ready state, the BBM proceeds: (a) to block 94 if the FIM interface signals the BBM that a bad data block has been detected and requests the BBM to re-map that bad data block; (b) to block 96 if the FIM requests access to specific client data; or (c) to block 98 if BBM operation is to end.

Figure 14A:
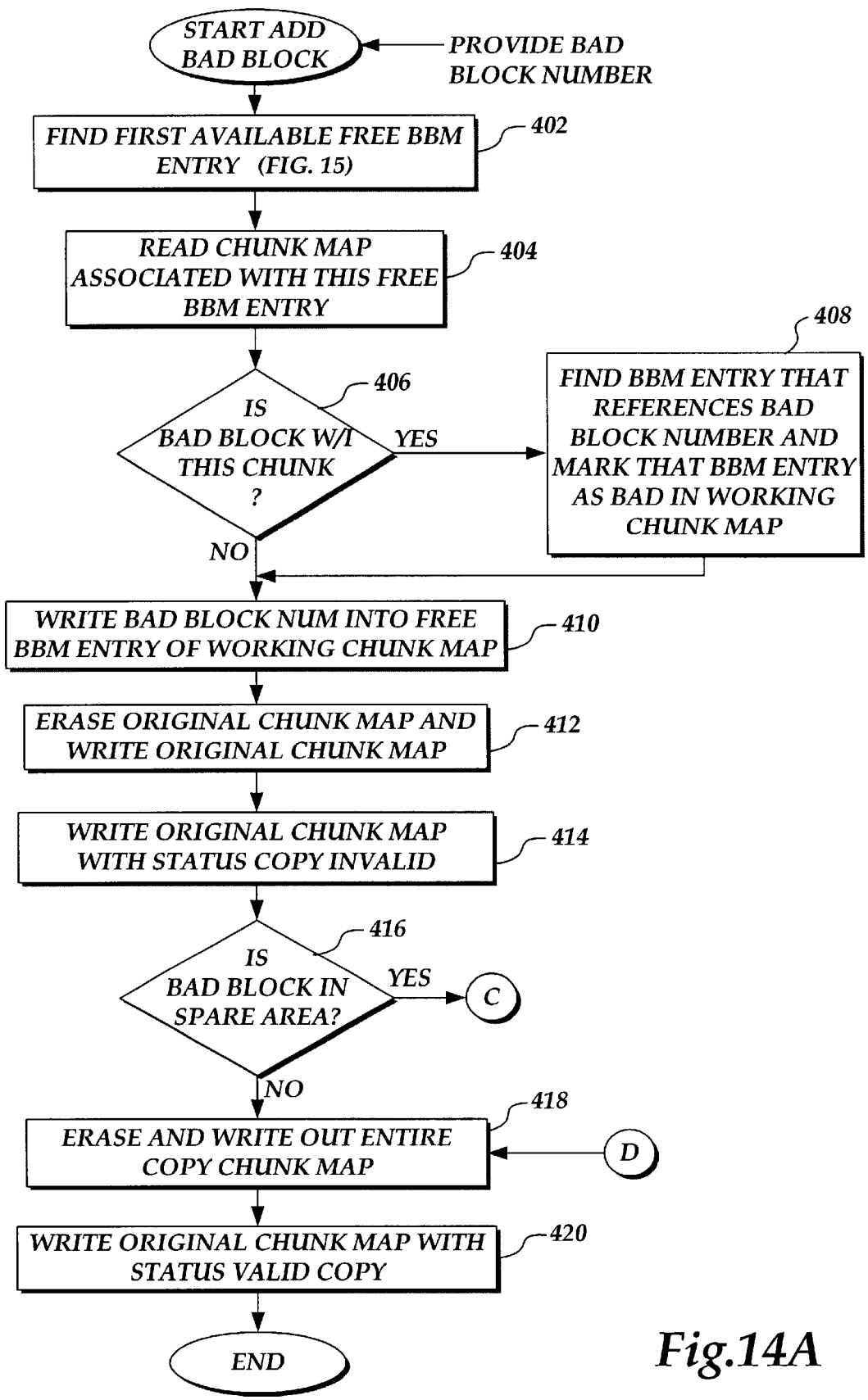
FIGS. 14A–14B are flow diagrams illustrating a process of adding a bad block suitable for use in the process shown in FIG. 7.
Figure 14B:
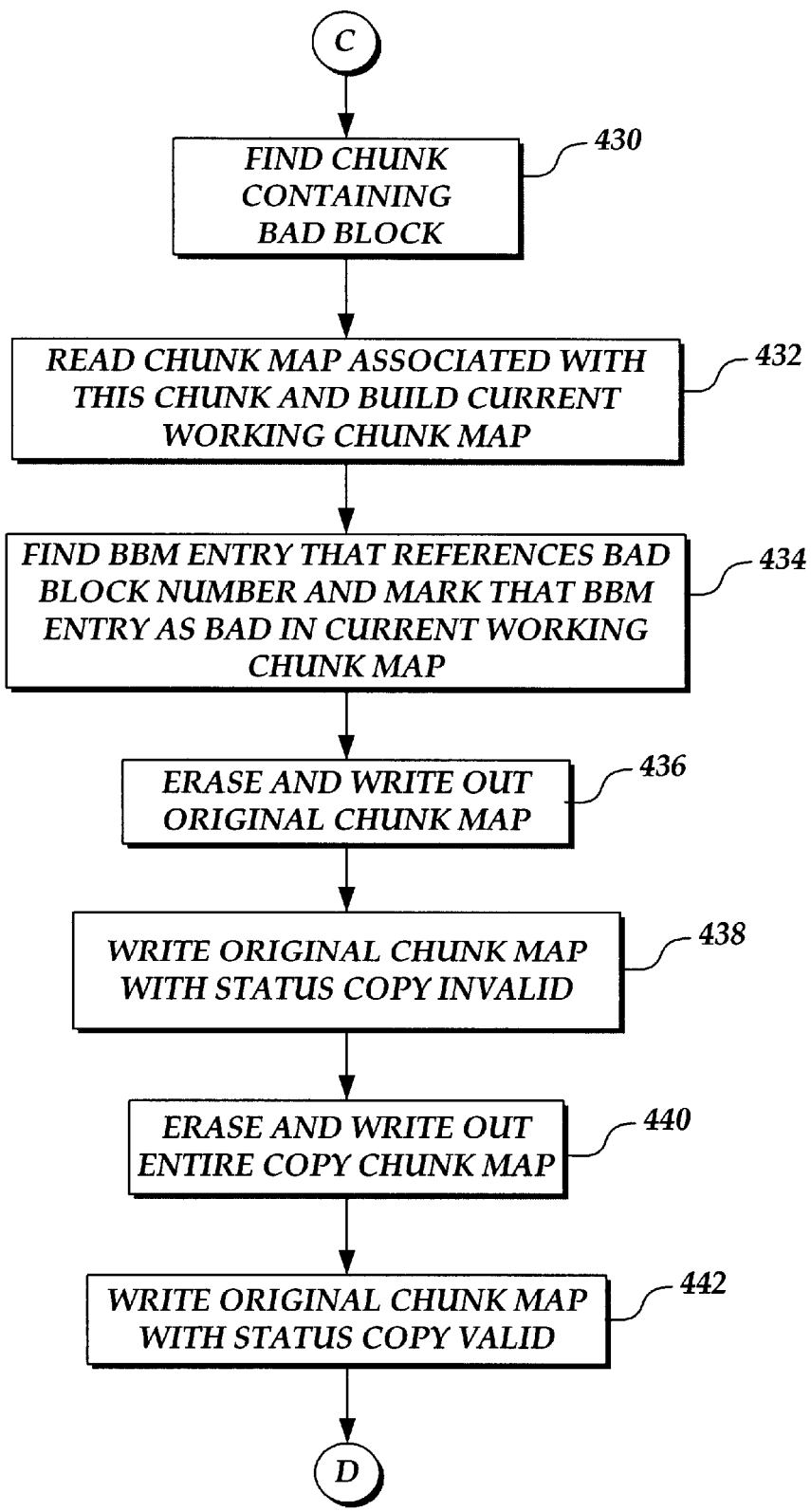

FIG. 14A and 14B form a detailed flow diagram illustrating the add bad block process (block 94 of FIG. 7), i.e., the process that re-maps a bad block to a good spare block. As mentioned earlier, this process starts when the FIM provides a bad block number to the BBM process. Briefly, the bad block number may be a data block number or a spare block number. The bad block number is a spare block number when the spare block that is currently storing data goes bad. In this situation, the data stored in the bad spare block must now move to a different (good) spare block. In addition, the bad spare block must be marked bad so that the spare block will not be used in the future. First, at block 402 of FIG. 14A, the first available free BBM entry is found.

Figure 15:
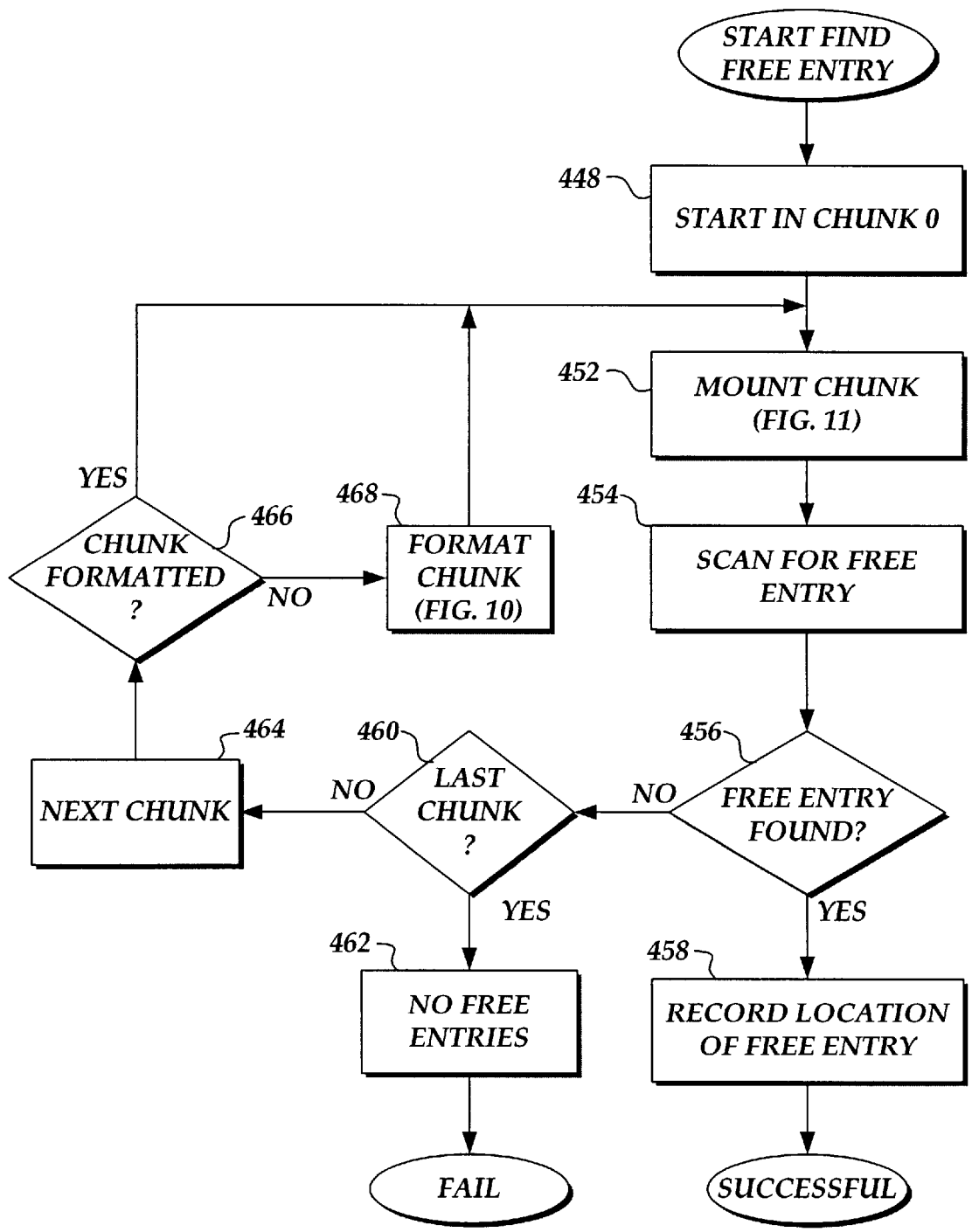
FIG. 15 is a flow diagram illustrating a process of finding a free entry suitable for use in the process shown in FIG. 14A.

FIG. 15 is a detailed flow diagram that illustrates the process of finding a free BBM entry. First, at block 448, chunk 0, the chunk with the highest addressable spare block, is selected. Next, at block 452, the selected chunk is mounted in the manner illustrated in FIG. 11 and previously described. After the first chunk has been mounted successfully, the logic proceeds to block 454 where the chunk map of the selected chunk is scanned for a BBM entry that is free. A free BBM entry is denoted by the entry having a unique value, such as all ones or all zeroes which indicates that the BBM entry is in the erase state. When a free entry is found, or after the entire chunk map has been scanned for a free entry, the logic proceeds to decision block 456 where a test is made to determine if a free entry is found. If a free entry is found, the location of the free entry is recorded (block 458) and the find free entry process ends.

If a free entry is not found, the logic proceeds to block 460 where a test is made to determine whether the current chunk is the last chunk in the flash memory. If the current chunk is the last chunk, the logic proceeds to block 462 where the BBM process is alerted that no free entries were found. Thereafter, the find free entry process ends. If, however, the current chunk is not the last chunk, at block 464, the next chunk is found. At decision block 466, the BBM determines whether the chunk is formatted. If the chunk is not formatted, the logic proceeds to block 468 where the new chunk is formatted in the manner illustrated in FIG. 10 and previously described. The formatting of a new chunk indicates that all the free entries in the previous chunks were used or were bad.

After the new chunk is formatted, the logic cycles back to block 452, and the find free entry process proceeds in the manner described above. Because this chunk has been newly formatted, a free BBM entry will most likely be found (block 454). As a result, the logic proceeds from decision block 456 to block 458 to record the location of the free entry and the find free entry process ends.

Returning to FIG. 14A, after a free BBM entry has been found at block 402, the logic proceeds to block 404 where the chunk map having the free BBM entry is read. As described earlier, each chunk map contains a number of BBM entries that reference each spare block in that chunk. In decision block 406, the BBM determines whether the bad block number, which the FIM requested to be re-mapped, is located in the chunk containing the free BBM entry. If the bad block number is located in the current chunk, the logic proceeds to block 408 where the BBM entry that references the bad block number (spare block) is found and marked as bad in the working chunk map. As described earlier, marking the block as bad in the working chunk map involves programming the valid bit to zero in the BBM Entry indexes to that block. The logic then proceeds to block 410.

The logic also proceeds to block 410 if the bad block number is not within the current chunk at decision block 406. This means that the bad block is either a data block or is a spare block located within another chunk. At block 410, the bad block number is written into the free BBM entry. If the bad block number is a data block number, the actual data block number is written into the free BBM entry. If the bad block number is a spare block number, the bad data block number stored in the BBM entry that references the bad spare block is written into the free BBM entry. This effectively changes the reference for the bad data block from a bad spare block to a good spare block. As those skilled in the art will appreciate, because the BBM entries are in an erased state before the initial re-mapping of a bad data block to a good spare block, it is possible for the BBM entries to be written or marked as bad without erasing the spare block first.

Other components of the flash control software copy the good data stored in the bad block to the new good spare block. This copying is performed after the BBM provides a location for the next available spare block (FIG. 15) and before the BBM updates the chunk maps (FIG. 14, blocks 412–420).

In addition, the In-Progress Index field of the BBM Header is marked using the value of the index into the BBM Entry that is currently being updated. This indication is used in the event of an interruption so that the BBM may determine which block is being mapped into a spare region.

Now, because the addition of the new BBM entry(s) need(s) to be accurately reflected in the chunk maps without compromising any data if there is an interruption, the BBM writes out the new BBM headers as shown in blocks 412–420 and blocks 430–442 of FIG. 14B. As stated earlier, the manner in which the chunk maps are updated provides a fully fault tolerant approach to managing bad areas in the flash memory and provides a mechanism that allows the flash memory to maintain the status of the bad area during run-time.

Figure 6:
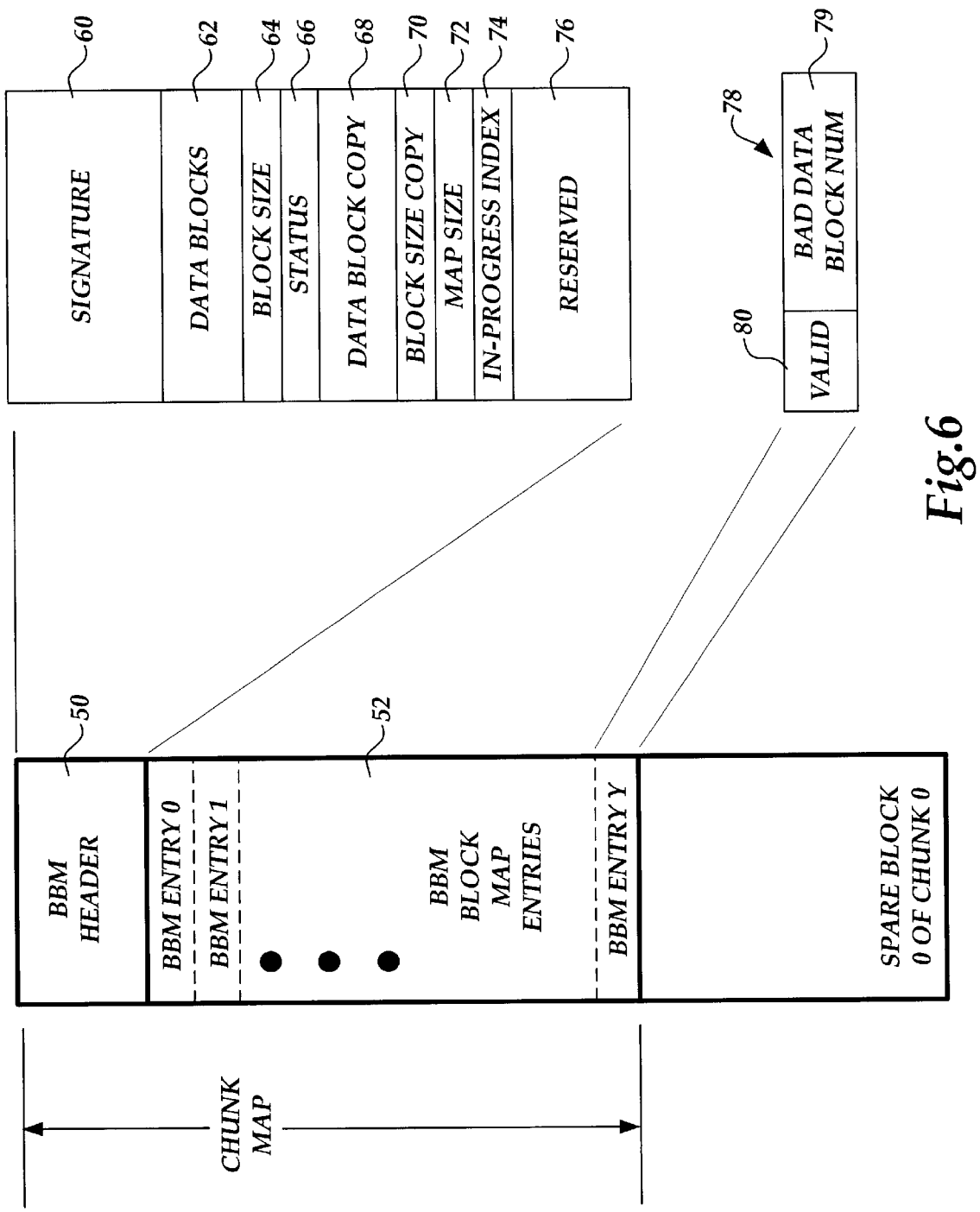
FIG. 6 shows a format for a chunk map found in a block of each chunk shown in FIG. 5.

First, at block 412, the original chunk map is erased so that new status information may be written. The original chunk map, now including the new BBM entry (or entries, if there was a bad spare block), is then rewritten to the same block. The BBM Header information is padded with "FF". The padding of the BBM Header with "FF"s allows the BBM to determine whether the chunk maps are valid if a power failure occurs before updating the Status field of the Original Chunk Map. Next, at block 414, the BBM writes the original chunk map BBM Header with a "status copy invalid" indication in the Status field 66 (FIG. 6). This "status copy invalid" indication denotes that the BBM is currently updating the chunk maps with a new BBM entry, the original chunk map is updated and the copy chunk map is not updated The logic then proceeds to block 416 where the BBM determines whether the bad block is in a spare area other than the spare area of the current chunk. If the bad block is not in the spare area (i.e. bad block number refers to a data block), further processing to locate the appropriate chunk is not needed and the original and copy chunk maps may be updated immediately. In this situation, the logic proceeds to block 418 where the copy chunk map is erased and then rewritten with the entire working chunk map which includes the new BBM entry and the necessary BBM Header information. The logic then proceeds to block 420 where the "status copy invalid" indication in the Status field of the original chunk map BBM Header is changed to a "status valid copy" indication. This change involves toggling a bit from the default erase state to a non-erase state. This change is accomplished without erasing the original chunk map before it is updated with the "status valid copy" indication due to the FF padding described above.

Now, going back to decision block 416, if the BBM determines that the bad block number refers to a spare block, the BBM proceeds to block 430 shown in FIG. 14B. This determination may occur if the FIM detects a bad spare block while attempting to access a bad data block already re-mapped to the bad spare block. In this situation, the bad data block information currently stored in the bad spare block is moved to a good spare block and the bad spare block is marked bad in the associated chunk map.

At block 430, the chunk containing the bad block (i.e., spare bad block) is found using the bad block number. As mentioned earlier, each chunk map maintains status information about all the spare blocks within that chunk. The logic then proceeds to block 432 where the chunk map associated with this chunk are read. The data read is then used to build a new current working chunk map. The current working chunk map stores information for a different chunk than the working chunk map referred to in FIG. 14A. As those skilled in the art will appreciate, before reading the chunk map, the chunk maps are located and preferably validated as described above. After the chunk map associated with this chunk is read, the BBM proceeds to block 434 to find the BBM Entry that references the bad block number and to mark the found BBM Entry as bad in the current working chunk map. Then, at block 436, the original chunk map is erased so that new status information may be written. The original chunk map is then rewritten to the same block using the information contained in the current working chunk map except for the BBM Header information, which is padded with "FF". Next, the BBM writes a "status copy invalid" indication in the Status field of the new original chunk map BBM header. See block 438. This "status copy invalid" indication denotes that the BBM is currently updating the chunk maps with the new BBM entry, the original chunk map is updated and the copy chunk map is not updated.

The logic then proceeds to block 440 where the copy chunk map is erased and then rewritten with the entire current working chunk map, which includes the new BBM entry and the necessary header information. The logic then proceeds to block 442 where the "status copy invalid" indication in the Status field of the original chunk map to a "status copy valid" indication. This indication denotes that the chunk maps that store information for the bad spare block are now properly completed and valid. The logic then continues at block 418 of FIG. 14A as described above. Blocks 418 and 420 finishing updating the chunk maps that had the new BBM Entry. This completes the addition of a new bad block (i.e. re-mapping) shown in block 94 of FIG. 7.

Figure 16:
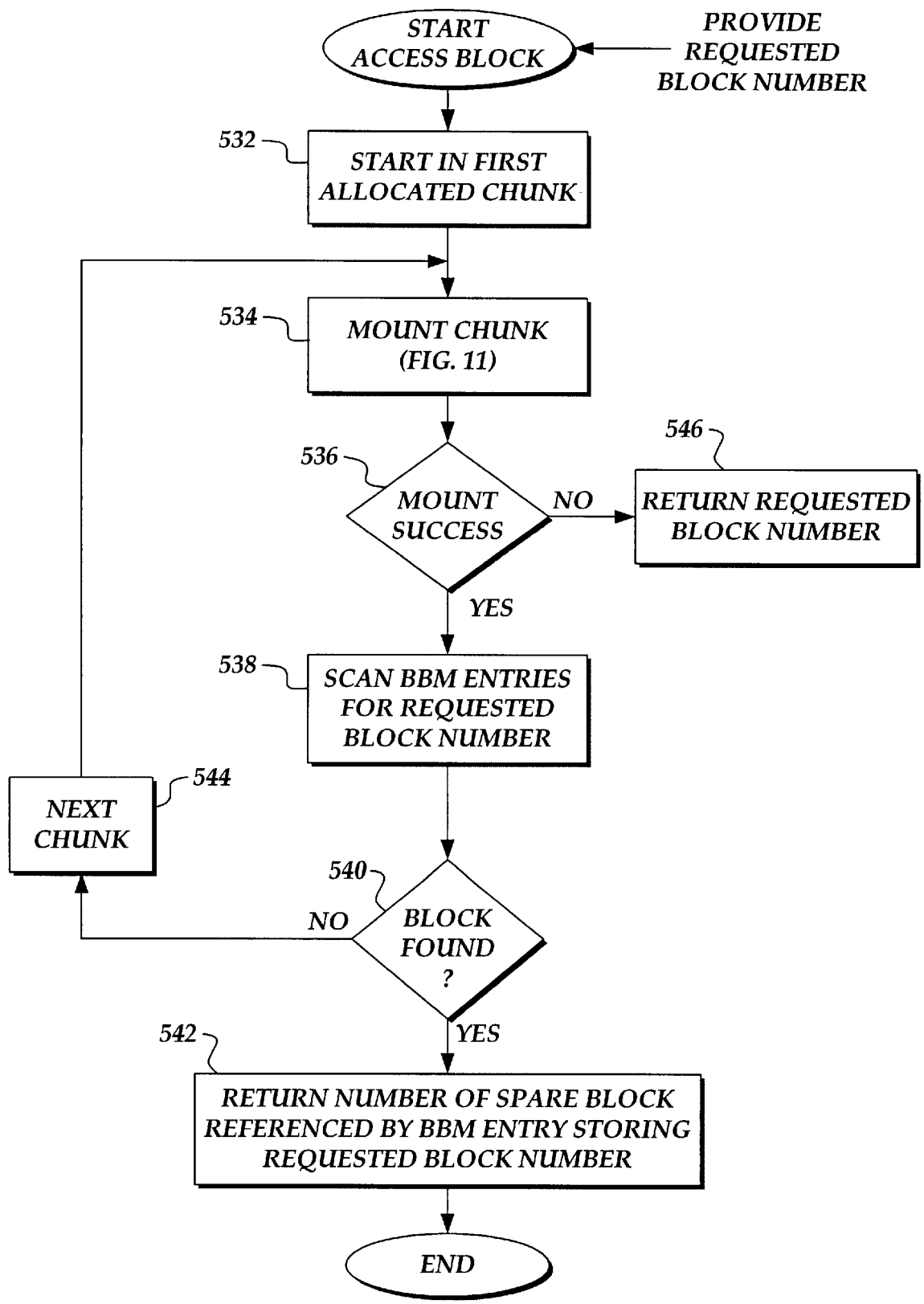
FIG. 16 is a flow diagram illustrating a process of accessing a block suitable for use in the process shown in FIG. 7.

Now, referring back to FIG. 7, at event block 90, while in the ready state, the BBM may receive a request to access a block. Typically, this occurs when data needs to be read or written from the flash memory. FIG. 16 is a flow diagram illustrating a more detailed process for accessing a block. First, at block 532, the first allocated chunk is found. The BBM then proceeds to block 534 to mount the first allocated chunk (i.e., chunk 0). Mounting chunk 0 is accomplished as described earlier in reference to FIG. 11. After the chunk is mounted, the logic proceeds to decision block 536 where a test is made to determine if the mount was successful. Typically, the mount of the first chunk is successful so that the logic does not proceed immediately to block 546 where the requested block number is returned. Usually, block 546 is reached when all allocated chunks have been scanned and no more chunks exist or are formatted.

Therefore, assuming the mount was successful from decision block 536, the BBM proceeds to block 538 where the BBM entries are scanned for the requested block number. During block 538, the data stored in each BBM entry is compared to the requested block number to see whether there is a match. A data match indicates that the requested block number is re-mapped to a spare block in the current chunk. After a chunk is scanned, the BBM logic proceeds to decision block 540 where a test is made to determine if the requested block number was found. If the requested block was found the BBM proceeds to block 542 where the number of the spare block referenced by the BBM Entry storing the requested block number is returned.

Referring back to decision block 540, if the requested block number is not found, the logic proceeds to block 544 where the next chunk is found. The BBM then attempts to mount the chunk. See block 534. If the next chunk is not a valid chunk or is not formatted, the BBM will indicate that the mount was not successful at decision block 536. In this circumstance, the logic proceeds to block 546 where the requested block number is returned. Then the process ends. As described earlier, this means that the requested block number is not currently re-mapped and the requested data block number in the data area is good and may be used.

Referring back to FIG. 7, from the event block 90, the BBM logic may also proceed to block 98 to unmount the BBM. The BBM is unmounted by designating the working chunk map as invalid. This designation causes BBM processing to stop. In order to start the BBM again for this flash memory, the INIT BBM illustrated in FIG. 8 and described above must be completed.

Even though the flow diagrams described above do not illustrate the timing of BBM error checking, the BBM typically performs error checking whenever there is a write to the flash memory and whenever a free BBM entry is found. The error checking that occurs when a write takes place determines whether the spare block is bad and whether the chunk maps need to be moved. The error checking that occurs when a free BMM entry is found involves stress testing the block and marking the block accordingly.

In one actual embodiment of this invention, six blocks out of each chunk are reserved to be for chunk maps only. This allows the chunk maps to be replaced at least twice if failures are detected. In addition, in this embodiment 120 spare blocks are grouped into each chunk. This grouping results in the chunk maps never being updated more than 240 times in their lifetime. The 240 update limit is based on the BBM logic that updates the chunk maps. The logic uses two erase/write cycles. The first erase/write cycle is to put the new BBM entry into the chunk map. The second erase/write cycle is to update the status of the chunk maps when the updating is completed. Grouping the spare blocks grouped into chunks, results in the spare blocks containing the chunk maps being updated considerably less than the guaranteed lifetime erase/write cycles.

If the flash memory requires Error Correcting Codes, another embodiment of the BBM may include a redundant area structure comprising an User Area field, Data/Block Status field, an ECC2 field, and an ECC1 field. In one actual embodiment of this invention, each of these fields is four bytes long. The User Area field is reserved for the flash file system. The Data/Block Status field stores a value indicating the validity of the block and the validity of the contents of the block. A value of 0xFFFFFFFF indicates that the ECC is not valid and the data contents have not been written and a value of 0x7FFFFFFF indicates that data is written and ECC is written into the ECC1 and ECC2 fields. The ECC1 field stores the ECC value of the first half of the block and the ECC2 field stores the ECC value of the second half of the block. As those skilled in the art will appreciate, the redundant area structure may be modified to accommodate different ECC techniques. During the add bad block process (FIG. 14A), the BBM writes zeroes into the Data/Block Status field to signal the block as bad. Other areas of the redundant area structure are preserved. The writing into the Data/Block Status field occurs before updating the original chunk map, block 412 in FIG. 14A.

In another embodiment of the BBM, the working chunk map may include portions of the Original Chunk Map or Copy Chunk Map. In this embodiment, the portion may comprise the contents of one or more of the fields in the BBM Header and/or BBM Entries. The portion is stored and updated using registers. The BBM reads a portion from the flash memory, stores the portion in the register, revises the portion, and then writes the revised portion to the flash memory.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for managing bad areas in flash memory, the method comprising:
   (a) formatting the flash memory into a data area and a spare area, each area having a plurality of blocks, wherein the blocks in the data area are data blocks and the blocks in the spare area are spare blocks and wherein any data block and spare block having a bad area in flash memory is considered to be a bad block;
   (b) grouping the spare blocks within the spare area into a plurality of chunks;
   (c) for each of the plurality of chunks in the spare area,
      (1) storing an original chunk map in at least one spare block within each chunk;
      (2) storing a copy chunk map in at least one other spare block within each chunk; and
   (d) for each bad block, mapping content of the bad block to an available spare block in an available chunk by updating the original chunk map and the copy chunk map associated with the available spare block.

2. The method of claim 1, wherein storing the original chunk map in the at least one spare block comprises:
   (a) creating a working chunk map having a header, wherein the header includes a status field and a number representing the number of data blocks in the data area available for storing data; and
   (b) writing the header of the working chunk map into the at least one spare block of at least one chunk on the flash memory.

3. The method of claim 2, wherein storing the original chunk map in the at least one spare block further comprises storing a first identifier in the status field before writing the header.

4. The method of claim 2, wherein storing the copy chunk map in the at least one other spare block comprises:
   (a) storing a second identifier in the status field of the working chunk map; and
   (b) writing the header of the working chunk map into the at least one other spare block on the flash memory.

5. The method of claim 2, wherein the copy chunk map and the original chunk map comprise a plurality of entries that correspond to the plurality of spare blocks in one of the plurality of chunks.

6. The method of claim 5, wherein mapping the content of the bad block to the available spare block comprises:
   (a) finding an available free entry in the plurality of entries in the spare area;
   (b) creating a free entry working chunk map; and
   (c) updating the original chunk map and the copy chunk map associated with the available free entry.

7. The method of claim 6, wherein creating the free entry working chunk map comprises:
   (a) reading the original chunk map associated with the available free entry; and
   (b) copying content of the original chunk map associated with the available free entry into the free entry working chunk map.

8. The method of claim 6, wherein finding an available free entry in the plurality of entries comprises searching through the original chunk maps.

9. The method of claim 6, wherein finding an available free entry in the plurality of entries comprises searching through the copy chunk maps.

10. The method of claim 6, wherein updating the original chunk map and the copy chunk map associated with the available free entry comprises:
   (a) writing a block number associated with the bad block into the available free entry of the free entry working chunk map;
   (b) erasing the spare block storing the original chunk map associated with the available free entry, writing the free entry working chunk map as the original chunk map in the spare block that was previously erased and writing a first indicator to the original chunk map on the flash memory associated with the available free entry;
   (c) erasing the spare block storing the copy chunk map associated with the available free entry, writing the free entry working chunk map into the spare block that was previously erased of the copy chunk map; and
   (d) writing a second indicator to the original chunk map on the flash memory associated with the available free entry.

11. The method of claim 10, wherein writing the block number associated with the bad block into the available free entry of the working chunk map comprises determining whether the block number references one of the data blocks; if so, writing a data block number into the available free entry that corresponds to the bad block; otherwise, if the block number references a spare block number, writing into the available free entry the bad data block number corresponding to the bad data block that was previously mapped.

12. The method of claim 10, wherein if the bad block is in the spare area, the method further comprises:
   (1) reading the original chunk map associated with the bad block;
   (2) creating a second working chunk map containing contents of the original chunk map associated with the bad block;
   (3) finding a first entry in the second working chunk map that corresponds to the bad block; and
   (4) updating the original chunk map and copy chunk map associated with the bad block;
   wherein (1)–(4) are completed before (c) and (d) of claim 10.

13. The method of claim 12, wherein updating the original chunk map and copy chunk map associated with the bad block comprises:
   (a) writing a bad indicator in the first entry;
   (b) erasing the spare block associated with the bad block and writing the second working chunk map as the original chunk map;
   (c) writing a status copy invalid indicator in the original chunk map on the flash memory associated with the chunk containing the bad block;
   (d) erasing the spare block containing the copy chunk map associated with the bad block and writing the second working chunk map as the copy chunk map; and
   (e) writing a status copy valid indicator in the original chunk map on the flash memory associated with the bad block.

14. The method of claim 6, further comprising marking the entry associated with the bad block in the free entry working chunk map if the bad block is within the available chunk.

15. The method of claim 6, further comprising copying valid content of the bad block to the available spare block.

16. The method of claim 1, further comprising validating the original chunk map and the copy chunk map associated with the available spare block.

17. The method of claim 16, wherein validating the original chunk map and the copy chunk map associated with the available spare blocks comprises moving the original chunk map and the copy chunk map associated with the available spare chunk when either the original chunk map or the copy chunk map is in the bad block.

18. The method of claim 17, wherein moving the original chunk map and the copy chunk map associated with the available spare chunk comprises:
   (a) if the copy chunk map is in the bad block, copying the contents of the original chunk map associated with the available spare block to a second working chunk map; else, copying the contents of the copy chunk map associated with the available spare block to the second working chunk map;
   (b) locating a first available spare block and a second available spare block within the available chunk;
   (c) writing an allocated status in the second working chunk map that corresponds to the first available spare block and the second available spare block;
   (d) writing the second working chunk map to one of the first and second available spare blocks and designating the written available spare block as the moved original chunk map;
   (e) writing the second working chunk map to the other available spare block and designating the other available spare block as the moved copy chunk map; and
   (f) updating status for the original chunk map and the copy chunk map.

19. The method of claim 18, wherein updating status for the original chunk map and the copy chunk map comprises:
   (a) writing an invalid status in the original chunk map; and
   (b) writing the invalid status in the copy chunk map.

20. The method of claim 18, wherein locating the first available spare block and the second available spare block comprises searching a predetermined number of consecutive spare blocks in the available chunk for the first available spare block.

21. The method of claim 1, wherein the original chunk map and the copy chunk map are stored in a next chunk when the available spare block does not exist in a current chunk.

22. The method of claim 1, further comprising providing a location to a flash file system for a requested data block.

23. The method of claim 22, wherein providing the location comprises:
   (a) scanning content in the original chunk map for the block number associated with the requested data block; and
   (b) if found, providing the spare block number that corresponds to the entry storing a requested block number; otherwise, providing the requested data block number.

24. The method of claim 1, wherein the spare blocks and the data blocks are equally sized.

25. The method of claim 1, wherein the spare area is contiguous and sized smaller than the data area.

26. The method of claim 1, wherein the spare area is sized proportional to a reliability factor of the flash memory.

27. A computer-readable medium having computer executable components for managing bad areas in flash memory, the computer-readable medium having computer-executable components comprising:
(a) a formatting component for formatting the flash memory into a data area and a spare area, each area having a plurality of blocks, wherein the blocks in the data area are data blocks and the blocks in the spare area are spare blocks, wherein any data block and spare block having bad areas in flash memory are considered to be bad blocks and wherein the spare blocks within the spare area are grouped into a plurality of chunks; and
(b) a mapping component for mapping content of a bad block to an available spare block by updating an original chunk map and a copy chunk map associated with the available spare block.

28. The computer-readable medium of claim 27, wherein the formatting component formats the flash memory by storing the original chunk map in the at least one spare block within each chunk and storing a copy chunk map in at least one other spare block within each chunk.

29. The computer-readable medium of claim 28, wherein the formatting component stores the original chunk map by:
(a) creating a working chunk map having a header, wherein the header includes a status field and a number representing the number of data blocks in the data area available for storing data; and
(b) writing the header of the working chunk map into the at least one spare block of at least one chunk on the flash memory.

30. The computer-readable medium of claim 29, wherein the formatting component further stores the original chunk map in the at least one spare block by storing a first identifier in the status field before writing the header.

31. The computer-readable medium of claim 29, wherein the formatting component stores the copy chunk map in the at least one other spare block by:
(a) storing a second identifier in the status field of the working chunk map; and
(b) writing the header of the working chunk map into the at least one other spare block on the flash memory.

32. The computer-readable medium of claim 29, wherein the mapping component maps the content of the bad block to the available spare block by:
(a) finding an available free entry in the plurality of entries in the spare area;
(b) creating a free entry working chunk map; and
(c) updating the original chunk map and the copy chunk map associated with the available free entry by modifying the free entry working chunk map and writing the free entry working chunk map to the flash memory as the original chunk map and as the copy chunk map.

33. The computer-readable medium of claim 32, wherein the mapping component creates the free entry working chunk map by:
(a) reading the original chunk map associated with the available free entry; and
(b) copying content of the original chunk map associated with the available free entry into the free entry working chunk map.

34. The computer-readable medium of claim 32, wherein the mapping component updates the original chunk map and the copy chunk map associated with the available free entry by:
(a) writing a block number associated with the bad block into the available free entry of the free entry working chunk map;
(b) erasing the spare block storing the original chunk map associated with the available free entry, writing the free entry working chunk map as the original chunk map in the spare block that was previously erased and writing a first indicator to the original chunk map on the flash memory associated with the available free entry;
(c) erasing the spare block storing the copy chunk map associated with the available free entry, writing the free entry working chunk map into the spare block that was previously erased of the copy chunk map; and
(d) writing a second indicator to the original chunk map on the flash memory associated with the available free entry.

35. The computer-readable medium of claim 34, wherein the mapping component writes the block number associated with the bad block into the available free entry of the working chunk map by determining whether the block number references one of the data blocks; if so, writing a data block number into the available free entry that corresponds to the bad block; otherwise, if the block number references a spare block number, writing into the available free entry the bad data block number corresponding to the bad data block that was previously mapped.

36. The computer-readable medium of claim 34, wherein if the bad block is in the spare area, the mapping component further updates the original chunk map and the copy chunk map associated with the bad block by:
(1) reading the original chunk map associated with the bad block;
(2) creating a second working chunk map containing contents of the original chunk map associated with the bad block;
(3) finding a first entry in the second working chunk map that corresponds to the bad block; and
(4) updating the original chunk map and copy chunk map associated with the bad block;
wherein (1)–(4) are completed before (c) and (d) of claim 34.

37. The computer-readable medium of claim 36, wherein the mapping component updates the original chunk map and copy chunk map associated with the bad block by:
(a) writing a bad indicator in the first entry;
(b) erasing the spare block associated with the bad block and writing the second working chunk map as the original chunk map;
(c) writing a status copy invalid indicator in the original chunk map on the flash memory associated with the chunk containing the bad block;
(d) erasing the spare block containing the copy chunk map associated with the bad block and writing the second working chunk map as the copy chunk map; and
(e) writing a status copy valid indicator in the original chunk map on the flash memory associated with the bad block.

38. The computer-readable medium of claim 32, wherein the mapping component further maps the content of the bad block by marking the entry associated with the bad block in the free entry working chunk map if the bad block is within the available chunk.

39. The computer-readable medium of claim 32, wherein the mapping component further maps the content of the bad block by copying valid content of the bad block to the available spare block.

40. The computer-readable medium of claim 28, wherein the mapping component further maps the content of the bad block by validating the original chunk map and the copy chunk map associated with the available spare block.

41. The computer-readable medium of claim 40, wherein the mapping component validates the original chunk map and the copy chunk map associated with the available spare block by moving the original chunk map and the copy chunk map associated with the available spare chunk when either the original chunk map or the copy chunk map is in the bad block.

42. The computer-readable medium of claim 41, wherein the mapping component moves the original chunk map and the copy chunk map associated with the available spare chunk by:
   (a) if the copy chunk map is in the bad block, copying the contents of the original chunk map associated with the available spare block to a second working chunk map; else, copying the contents of the copy chunk map associated with the available spare block to the second working chunk map;
   (b) locating a first available spare block and a second available spare block within the available chunk;
   (c) writing an allocated status in the second working chunk map that corresponds to the first available spare block and the second available spare block;
   (d) writing the second working chunk map to one of the first and second available spare blocks and designating the written available spare block as the moved original chunk map and writing the second working chunk map to the other available spare block and designating the other available spare block as the moved copy chunk map; and
   (e) updating status for the original chunk map and the copy chunk map.

43. The computer-readable medium of claim 42, wherein the mapping component updates the status for the original chunk map and the copy chunk map by:
   (a) writing an invalid status in the original chunk map; and
   (b) writing the invalid status in the copy chunk map.

44. The computer-readable medium of claim 42, wherein locating the first available spare block and the second available spare block comprises searching a predetermined number of consecutive spare blocks in the available chunk for the first available spare block.

45. The computer-readable medium of claim 28, further comprising a locator component for providing a location to a flash file system for a requested data block.

46. The computer-readable medium of claim 45, wherein the locator component provides the location by:
   (a) scanning content in the original chunk map for the block number associated with the requested data block; and
   (b) if found, providing the spare block number that corresponds to the entry storing a requested block number; otherwise, providing the requested data block number.

47. An apparatus for managing bad areas in flash memory, the apparatus comprising:
   (a) a processing unit;
   (b) a flash memory coupled to the processing unit, the flash memory comprising a data area and a spare area, wherein the data area includes a plurality of data blocks and the spare area includes a plurality of spare blocks, wherein any data block and spare block having a bad area in the flash memory is considered to be a bad block and wherein the spare blocks within the spare area are grouped into a plurality of chunks; and
   (c) a primary memory coupled to the processing unit, the primary memory storing instructions that control, execution of the instructions on the processing unit comprising:
      (i) storing an original chunk map in at least one spare block within each chunk;
      (ii) storing a copy chunk map in at least one other spare block within each chunk; and
      (iii) mapping content of the bad block to an available spare block in an available chunk by updating the original chunk map and the copy chunk map associated with the available spare block.

48. The apparatus of claim 47, wherein storing the original chunk map and the copy chunk map comprises:
   (a) creating a working chunk map having a header, wherein the header includes a status field and a number representing the number of data blocks in the data area available for storing data;
   (b) writing a portion of the working chunk map into the at least one spare block of the chunk on the flash memory; and
   (c) writing a portion of the working chunk map into the at least one other spare block on the flash memory.

49. The method of claim 47, wherein the copy chunk map and the original chunk map comprise a plurality of entries that correspond to the plurality of spare blocks in one of the plurality of chunks.

50. The apparatus of claim 49, wherein mapping the content of the bad block to the available spare block comprises:
   (a) finding an available free entry in the plurality of entries in the spare area;
   (b) creating a free entry working chunk map; and
   (c) updating the original chunk map and the copy chunk map associated with the available free entry.

51. The apparatus of claim 50, wherein creating the free entry working chunk map comprises:
   (a) reading the original chunk map associated with the available free entry; and
   (b) copying content of the original chunk map associated with the available free entry into the free entry working chunk map.

52. The apparatus of claim 51, wherein updating the original chunk map and the copy chunk map associated with the available free entry comprises:
   (a) writing a block number associated with the bad block into the available free entry of the free entry working chunk map;
   (b) erasing the spare block storing the original chunk map associated with the available free entry, writing the free entry working chunk map as the original chunk map in the spare block that was previously erased and writing a first indicator to the original chunk map on the flash memory associated with the available free entry;
   (c) erasing the spare block storing the copy chunk map associated with the available free entry, writing the free entry working chunk map into the spare block that was previously erased of the copy chunk map; and
   (d) writing a second indicator to the original chunk map on the flash memory associated with the available free entry.

53. The apparatus of claim 52, wherein writing the block number associated with the bad block into the available free entry of the working chunk map comprises determining whether the block number references one of the data blocks; if so, writing a data block number into the available free entry that corresponds to the bad block; otherwise, if the block number references a spare block number, writing into the available free entry the bad data block number corresponding to the bad data block that was previously mapped.

54. The apparatus of claim 53, wherein if the bad block is in the spare area, the method further comprises:
   (1) reading the original chunk map associated with the bad block;
   (2) creating a second working chunk map containing contents of the original chunk map associated with the bad block;
   (3) finding a first entry in the second working chunk map that corresponds to the bad block; and
   (4) updating the original chunk map and copy chunk map associated with the bad block;
   wherein (1)–(4) are completed before (c) and (d) of claim 52.

55. The apparatus of claim 54, wherein updating the original chunk map and copy chunk map associated with the bad block comprises:

(a) writing a bad indicator in the first entry;

(b) erasing the spare block associated with the bad block and writing the second working chunk map as the original chunk map;

(c) writing a status copy invalid indicator in the original chunk map on the flash memory associated with the chunk containing the bad block;

(d) erasing the spare block containing the copy chunk map associated with the bad block and writing the second working chunk map as the copy chunk map; and (e) writing a status copy valid indicator in the original chunk map on the flash memory associated with the bad block.

56. The apparatus of claim 55, further comprising marking the entry associated with the bad block in the free entry working chunk map if the bad block is within the available chunk.

57. The apparatus of claim 56, further comprising copying valid content of the bad block to the available spare block.

* * * * *